US011365786B2

(12) United States Patent
Fecko

(10) Patent No.: US 11,365,786 B2
(45) Date of Patent: Jun. 21, 2022

(54) TRANSMISSION

(71) Applicant: Kimex Group S.R.O., Košice (SK)

(72) Inventor: Tibor Fecko, Presov (SK)

(73) Assignee: Kimex Group S.R.O., Kosice (SK)

( * ) Notice: Subject to any disclaimer, the term of this patent is extended or adjusted under 35 U.S.C. 154(b) by 0 days.

(21) Appl. No.: 16/764,194

(22) PCT Filed: Nov. 12, 2018

(86) PCT No.: PCT/EP2018/080891
§ 371 (c)(1),
(2) Date: May 14, 2020

(87) PCT Pub. No.: WO2019/096723
PCT Pub. Date: May 23, 2019

(65) Prior Publication Data
US 2021/0239192 A1 Aug. 5, 2021

(30) Foreign Application Priority Data

Nov. 14, 2017 (EP) .................................... 17201636

(51) Int. Cl.
*F16H 1/32* (2006.01)
*F16H 3/64* (2006.01)
(Continued)

(52) U.S. Cl.
CPC ................. *F16H 3/64* (2013.01); *F16H 3/70* (2013.01); *F16H 2001/323* (2013.01); *F16H 2057/085* (2013.01)

(58) Field of Classification Search
CPC ........ F16H 3/64; F16H 3/70; F16H 2057/085; F16H 1/32–2001/323
(Continued)

(56) References Cited

U.S. PATENT DOCUMENTS 3,994,187 A * 11/1976 Milenkovic ............... F16H 1/32
475/168
5,954,609 A 9/1999 Fecko
(Continued)

FOREIGN PATENT DOCUMENTS

CN 1865731 A * 11/2006 ............... F16H 1/32
CN 103994184 A * 8/2014
(Continued)

*Primary Examiner* — Sherry L Estremsky

(57) ABSTRACT

A multi-speed transmission (01) having a px and having a zx is described. The px is equipped with a sun wheel (84) and at least one planet wheel (08). The cycloidal gear stage equipped with a ring gear (02) with a ring gear axis (20), at least one cycloidal disk (05, 06) rolling in the ring gear, with at least one off-center opening and with a number, equivalent to the number of planet wheels (08), of shared off-center eccentric shafts (03), each connected nonrotatably with a planet wheel (08) and located jointly rotatably around the ring gear axis (20) and having a number of eccentric portions (31, 32), equivalent to the number of vbs (05, 06), which are each supported rotatably in a respective off-center opening of the at least one cycloidal disk (05, 06). The transmission (01) is distinguished by a support of its gear stages relative to the ring gear (02), also called and/or capable of being called a load-bearing body and being for instance at least a part of its machine frame, with bearing elements located exclusively on one side of the ring gear (02). First molding surfaces (33) are embodied on the eccentric shafts (03), and second molding surfaces (82) are embodied on the planet wheels (08), with which molding surfaces the planet wheels (08) mesh with the first molding surfaces (33) on the eccentric shafts (03).

25 Claims, 30 Drawing Sheets

Figure 1:
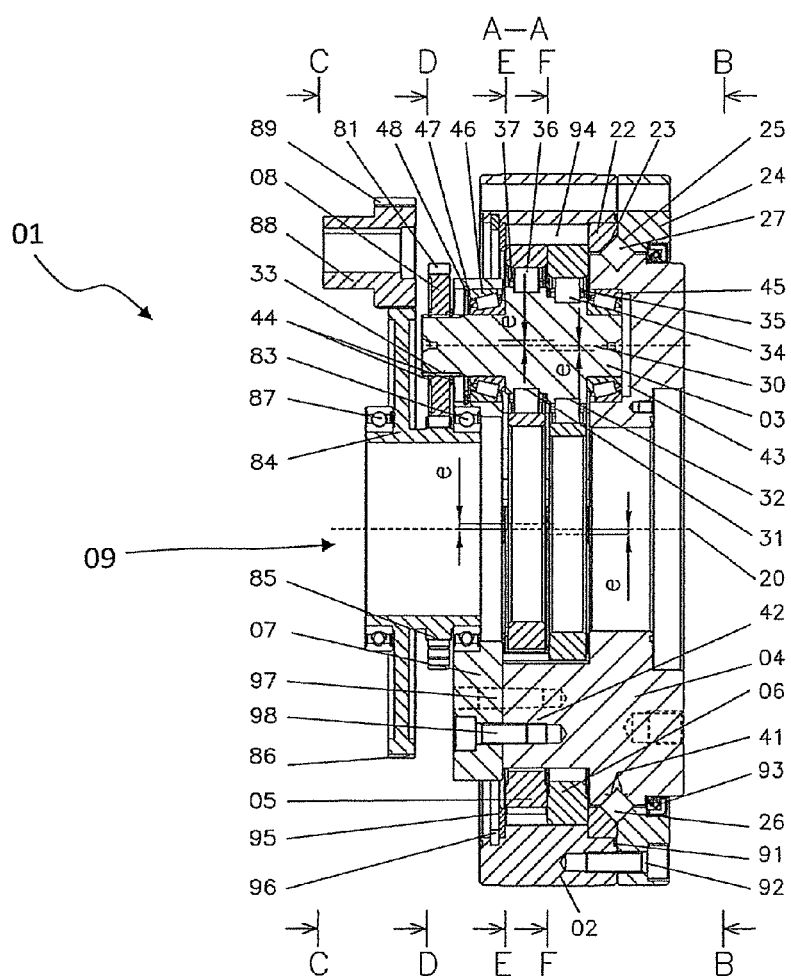

(51) Int. Cl.
*F16H 3/70* (2006.01)
*F16H 57/08* (2006.01)

(58) Field of Classification Search
USPC .......................................................... 475/178
See application file for complete search history.

(56) References Cited

U.S. PATENT DOCUMENTS

| | | | | |
|---|---|---|---|---|
| 6,761,660 | B2 * | 7/2004 | Lim ........................ | F16H 1/32 |
| | | | | 475/179 |
| 7,081,062 | B2 * | 7/2006 | Tesar ...................... | F16H 1/32 |
| | | | | 475/163 |

FOREIGN PATENT DOCUMENTS

| | | | | | |
|---|---|---|---|---|---|
| CN | 104864036 | A | * | 8/2015 | ............... F16H 3/44 |
| CN | 105972162 | A | * | 9/2016 | |
| CN | 106763531 | A | * | 5/2017 | |
| CN | 108843748 | A | * | 11/2018 | |
| DE | 19541806 | C1 | | 1/1997 | |
| DE | 112010005106 | T5 | | 12/2012 | |
| DE | 102012210169 | A1 | * | 12/2013 | ............... F16H 1/32 |
| DE | 112014003313 | T5 | | 3/2016 | |
| DE | 102015011962 | A1 | | 1/2017 | |
| DE | 102017128635 | A1 | | 6/2018 | |
| JP | 03041239 | A | * | 2/1991 | |
| JP | 2007085530 | A | * | 4/2007 | ............... F16H 1/32 |
| JP | 2015116072 | A | | 6/2015 | |
| WO | 2017008874 | A1 | | 1/2017 | |
| WO | 2017076506 | A1 | | 5/2017 | |

* cited by examiner

TRANSMISSION

CROSS-REFERENCE TO RELATED APPLICATIONS

This application is a national phase application under 35 U.S.C. § 371 of International Application No. PCT/EP2018/080891, filed Nov. 12, 2018, which claims priority to and the benefit of European Patent Application No. 17201636.2, filed Nov. 14, 2017. The contents of the referenced patent applications are incorporated into the present application by reference.

The invention relates to a multi-speed transmission.

Cycloidal gears and planetary gears are types of gears that have a high load capacity, require little space, have a high gear ratio, and furthermore are not self-locking.

A cycloidal gear includes a ring gear, at least one cycloidal disk that rolls in the ring gear and has a central opening and at least one off-center opening, as well as a central eccentric shaft that has a number of eccentric portions equivalent to the number of cycloidal disks. On each eccentric portion of the central eccentric shaft, a cycloidal disk is located rotatably with its central opening. Shared eccentric elements located rotatably around the axis of the central eccentric shaft, the number of which elements is equivalent at most to the number of off-center openings, convert the motions of the one or more cycloidal disks, as they roll in the ring gear, into a rotary motion of a shaft. Typically, the eccentric elements are part of an output device, which can be connected to an output shaft, or can surround an output shaft, or can be surrounded by an output shaft.

A planetary gear is for example a spur gear or friction gear, which along with shafts that are fixed to the frame also have shafts which revolve on circular tracks in the frame. The axes of the revolving shafts can run parallel to the axes of the shafts fixed to the frame. Planet wheels rotating on the revolving shafts orbit a central sun wheel.

In this connection it is important to note first that in the present document, the term "axis", contrary to the term shaft, designates a geometric axis, not a machine element.

An especially high gear ratio can be obtained by a two-stage or multi-speed transmission, which combines a first cycloidal gear that forms a first gear stage and a planetary gear that forms a second gear stage. The terms "first and second gear stage" serve merely to distinguish the two and do not indicate any specified order. The reason for this among others is that neither cycloidal gears nor planetary gears are self-locking. Accordingly, their input and output devices formed for instance by shafts can be exchanged in the sense that they are drivable from either the one or the other shaft without becoming jammed.

A disadvantage of the combination of cycloidal and planetary gears in a multi-speed transmission is the high cost of assembly. That cost is dictated on the one hand by the effort of joining the bearing elements, located on either side of the ring gear, together while simultaneously introducing the transmission stage components that are located between the two. This situation becomes more difficult on the other hand because of the tight space available overall in the transmission, which is meant to be compact in structure.

From WO 2017/076506 A1, a multi-speed transmission is known that has a planetary gear stage and a cycloidal gear stage. The planetary gear stage is equipped with a sun wheel and three planet wheels. The cycloidal gear stage is equipped with the following:

a ring gear, two cycloidal disks, rolling offset by 180° from one another in the ring gear, having at least three off-center openings, a central eccentric shaft having two eccentric portions offset by 180° from one another, on each of which eccentric portions a respective one of the cycloidal disks is located rotatably, and a number, equivalent to the number of planet wheels, of off-center eccentric shafts each connected nonrotatably to one planet wheel, having a number of eccentric portions equivalent to the number of planet wheels, with which eccentric portions each off-center eccentric shaft is supported rotatably each in one off-center opening of the cycloidal disks.

The off-center eccentric shafts form the elements, mentioned at the outset, which convert the movements of the cycloidal disks as they roll in the ring gear into a rotary motion.

From WO 2017/008874 A1, the same kind of gear is known, in which to simplify the assembly the eccentric shafts forming at least parts of an input or output device of the cycloidal gear and connecting the cycloidal gear stage and the planetary gear stage have nonround portions, on each of which a planet wheel of the planetary gear stage is located. The bearing of the transmission includes bearing elements located on both sides of the ring gear.

From DE 10 2017 128 635 A1, a transmission is known having a ring gear located in a housing, with a ring gear axis and a cycloidal disk rolling in the ring gear. The transmission further has a rotary body, supported rotatably on one side of the ring gear, that is synchronized with a rotating or revolving component of the cycloidal disk. The transmission has an outer ring, which is located either in the housing or in the rotary body. Furthermore, it has an inner ring, which is located on the other of the components—that is, the rotary body or the housing. Conical rollers serving as bearing elements are located between the outer and the inner ring, each in V-shaped grooves in the outer and inner ring.

A disadvantage of this is that for assembly, the bearing consisting of the inner ring and outer ring as well as the conical rollers must be press-fitted entirely into the housing and onto the rotary body. Furthermore, because of the requisite press fits, narrow limits are imposed on the axial forces acting on such a bearing along the ring gear axis and on the momentums about axles that extend perpendicular to the ring gear axle. Replacing damaged or worn bearing elements, including the inner and outer ring, is possible only by putting a considerable mechanical load on the overall gear construction. The press fits have to be undone by force inputs, by way of other gear elements that are likewise supported and hence vulnerable. The assembly is furthermore not possible with the desired precision and fineness, since to produce the press fits, strong compression forces must be exerted on the rotary body and in the housing. Alternative assembly techniques provide for screwing the inner ring onto the rotary body and/or the outer ring onto the housing. Because of the specified V-shaped grooves as tracks in the inner and outer rings, it is impossible in all the embodiments to establish a desired bearing play.

From JP 2015 116072 A, a multi-speed transmission having a planetary gear stage and a cycloidal gear stage is known. The planetary gear stage is equipped with a sun wheel and a planet wheel. The cycloidal gear stage is equipped with a ring gear and a ring gear axis, a cycloidal disk that rolls in the ring gear and has an off-center opening, and a number of off-center eccentric shafts, equivalent to the number of planet wheels. The off-center eccentric shafts of the cycloidal gear stage are located jointly rotatably around the ring gear axis and each is nonrotatably connected to a planet wheel. The eccentric shafts have a number of eccentric portions equivalent to the number of cycloidal disks. These eccentric portions are each rotatably supported in an off-center opening of the cycloidal disk. The transmission has a support of its gear stages opposite the ring gear on one side of the ring gear.

A disadvantage of the prior art that must be especially emphasized is that no notice whatever is paid to an exact alignment of planet wheels in their rotary position relative to eccentric portions of eccentric shafts connected nonrotatably to the planet wheels. If an exact alignment for one or the other embodiment should be necessary, such as a multi-speed transmission including a cycloidal gear stage and a planetary gear stage, it can be established during assembly only with a major expenditure of time and effort.

It is an object of the invention to create a multi-speed transmission which can be assembled more simply and less expensively.

This object is attained by the features of the independent claims. Advantageous embodiments are described in the claims, the drawings, and the ensuing description, including the description of the drawings.

Accordingly, the invention relates to a multi-speed transmission, having a planetary gear stage with a sun wheel and at least one planet wheel and a cycloidal gear stage with a ring gear and at least one cycloidal disk rolling in the ring gear, with at least one off-center opening, a number, equivalent to the number of planet wheels, of off-center eccentric shafts located jointly rotatably around the ring gear axis and each connected nonrotatably to one planet wheel, with a number of eccentric portions equivalent to the number of cycloidal disks. With each of these, one or more off-center eccentric shafts are rotatably supported in a respective off-center opening of the at least one cycloidal disk.

The transmission can have a central eccentric shaft with a number of eccentric portions that corresponds to the number of cycloidal disks. On each of these portions, one cycloidal disk is rotatably located.

The axis of the ring gear matches the axis of the central eccentric shaft. In other words, the ring gear is located coaxially to the axis of the central eccentric shaft.

Furthermore, the transmission can have elements reaching through off-center openings of the one or more cycloidal disks, which elements convert the motions of the cycloidal disks as they roll in the ring gear into a rotary motion.

The off-center eccentric shafts here can form the aforementioned elements, which convert the motions of the cycloidal disks as they roll in the ring gear into a rotary motion.

The transmission is advantageously distinguished by support of its gear stages, compared to the ring gear that for instance forms at least one part of its machine frame, with bearing elements located on only one side of the ring gear.

The machine frame is the sum of all the supporting parts of the transmission that forms the complex machine element. In particular, it supports the moving parts of the machine via bearings.

Advantageously, the transmission is distinguished by a one-sided bearing, which has a groove that is split in two. The groove is split in two between a first groove face and a second groove face. The groove faces form bearing running surfaces or tracks for bearing elements of what is for example a one-sided bearing.

For instance, the transmission can include an outer ring located on the ring gear.

The outer ring can be provided with a groove, for instance a V-shaped groove. The shanks of the V-shaped groove form tracks for roller bodies on the outer ring.

The outer ring is split in two to create the groove that is split in two. One shank of the groove, which is V-shaped, for example, is located or embodied on one part of the outer ring and the other shank on the remaining part of the outer ring. Thus both parts of the outer ring can each be provided with one of the aforementioned groove faces. Splitting the outer ring into an output bearing ring that has a shank and an output bearing body extends along the groove base of the groove that is for instance V-shaped.

A counterpart in the form more or less of a likewise for instance V-shaped groove can for example be embodied on an inner ring or directly on a rotary body that is rotatably supported in the ring gear around the ring gear axis.

On each of the eccentric shafts, a first molding surface that can also be called an eccentric shaft molding surface can be embodied. As on each of the planet wheels, a second molding surface, corresponding to the eccentric shaft molding surface, which can also be called a planet wheel molding surface, can be embodied. Each planet wheel, with its planet wheel molding surface, meshes with the eccentric shaft molding surface of the eccentric shaft assigned to it. As a result, the planet wheels are oriented identically relative to eccentric shafts.

Alternatively or in addition, the transmission is established by corresponding molding surfaces distinguished by an exact alignment of the planet wheels relative to the off-center eccentric shafts. This is advantageously brought about by corresponding molding surfaces on their outer circumference—and on the planet wheels—advantageously on their inner circumference oriented toward the off-center eccentric shafts.

Additional advantages going beyond a complete attainment of the stated object, compared to the prior art, are obtained for example as follows.

For the sake of simplicity, to explain the principle, the term "tooth" will be used hereinafter to represent all conceivable embodiments of the contact between the cycloidal disk and the ring gear.

A cam of a cycloidal gear drives a cycloidal disk having n teeth, which cycloidal disk rolls in a fixed housing having n+1 teeth. The cycloidal disk then rolls via the teeth of the housing. Each revolution of the input shaft and thus of the cam moves the cycloidal disk and with it the output shaft onward by one tooth. The result is lower rotary speeds contrary to the direction of rotation of the input shaft. The transmission ratio i, for which $i=n/((n+1)-n)$, is equivalent to the number n of teeth of the cycloidal disk. The transmission ratio i is equivalent to the ratio of the number of revolutions of the input shaft to the number of revolutions of the output shaft.

To obtain a high power density along with an always uniform mass distribution, it is known to embody cycloidal gears with two or more cams, located in equal distribution about the input shaft, and a number of cycloidal disks equivalent to the number of cams. As a result, high rotary speeds and high force transfers, and accordingly high performance, can be achieved as well.

In order to enable consistently uniform mass distribution of two or more cycloidal disks over one full revolution of the cycloidal gear, corresponding to one full revolution of the output shaft, by means of a uniformly distributed arrangement about the input shaft, an even number of teeth in the fixed housing is necessary.

Single-stage cycloidal gears with two or more cycloidal disks distributed uniformly about the input shaft thus have an uneven-numbered gear ratio.

As a result, such cycloidal gears can be used to only a limited extent in connection with actuating drives, in which, to obtain a definitive ratio between input revolutions and output revolutions of a transmission, an even-numbered gear ratio is preferred.

To obtain an even-numbered transmission gearing, the invention combines a cycloidal gear stage with a planetary gear stage to make a multi-speed transmission. This gear, with for instance two or more stages, can have an even-numbered gear ratio.

Furthermore, the multi-speed transmission including a combination of a cycloidal gear and a planetary gear can include a spur gear that forms a third gear stage, advantageously for example a pinion that meshes with the sun wheel of the planetary gear.

Alternatively or additionally, the transmission can have individual features, or features describing a combination of exemplary embodiments shown initially in conjunction with the prior art and/or in one or more of the documents mentioned as prior art and/or in the ensuing description of the exemplary embodiments shown in the drawings.

Also conceivable is a multi-speed transmission that has a spur gear stage with a wheel connected nonrotatably, for instance to a central eccentric shaft, a pinion meshing with the wheel, a cycloidal gear stage with a ring gear, at least one cycloidal disk rolling in the ring gear and having at least one off-center opening, and one or more off-center eccentric shafts, located jointly rotatably around the axis of the ring gear, with the number of cycloidal disks being equivalent to the number of eccentric portions. With each of these portions, one or more off-center eccentric shafts are rotatably supported each in an off-center opening of the at least one cycloidal disk. Such a transmission can, alternatively or additionally, have individual features, or a combination of a plurality of features, recited above and below, describing the multi-speed transmission with a planetary gear stage and a cycloidal gear stage, and/or individual features, or features describing a combination of exemplary embodiments shown initially in conjunction with the prior art and/or in one or more of the documents mentioned as prior art and/or in the ensuing description of the exemplary embodiments shown in the drawings.

Further advantages, going beyond the complete achievement of the stated object and/or those cited above relating to the individual features, over the prior art are discussed below.

Figure 2:
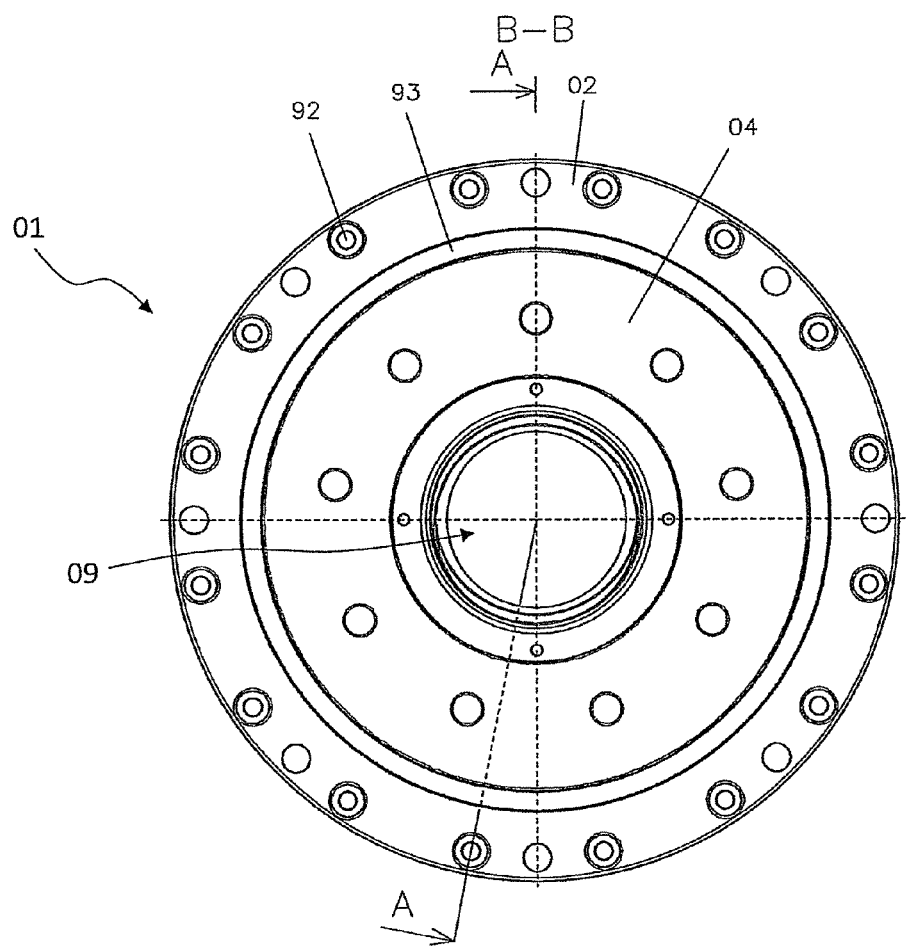
Figure 3:
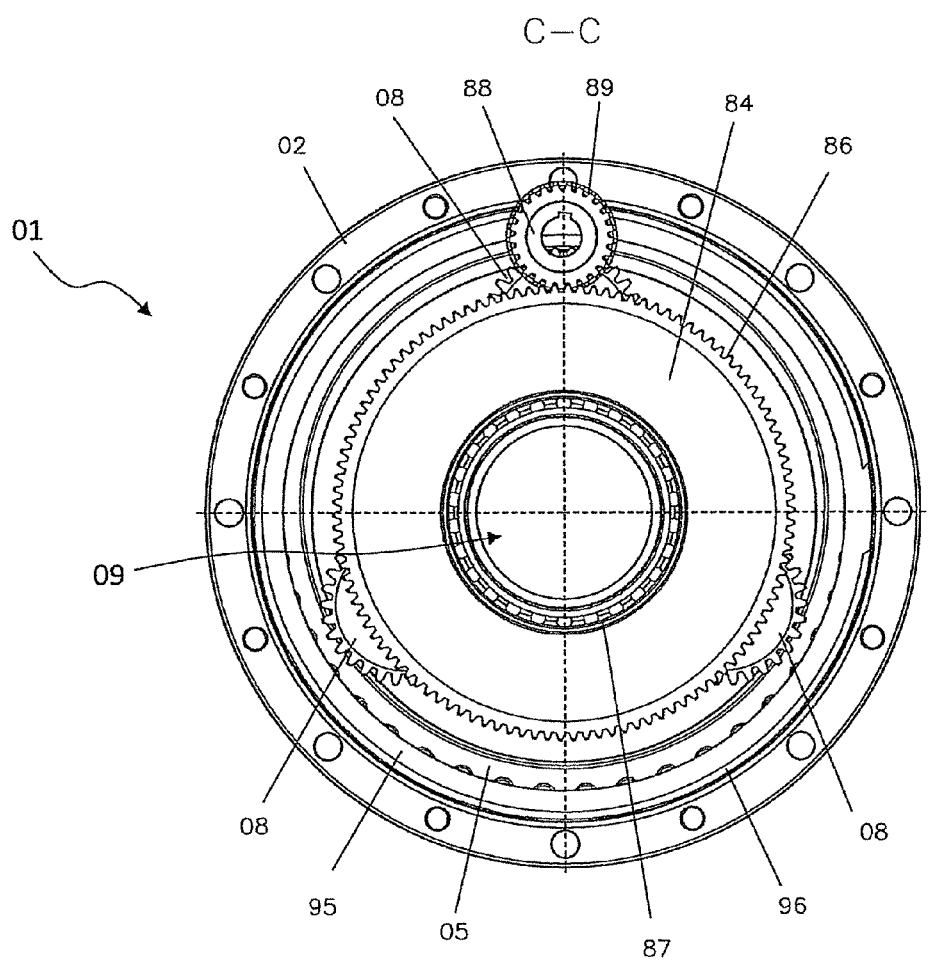
Figure 4:
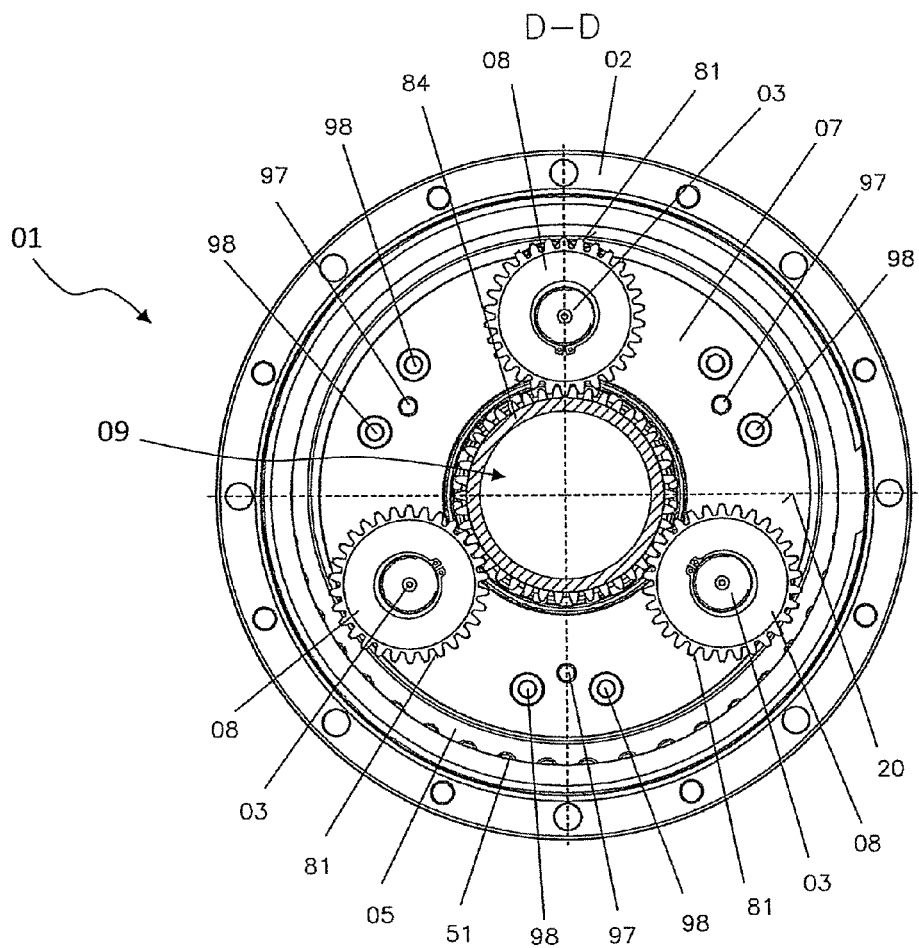
Figure 5:
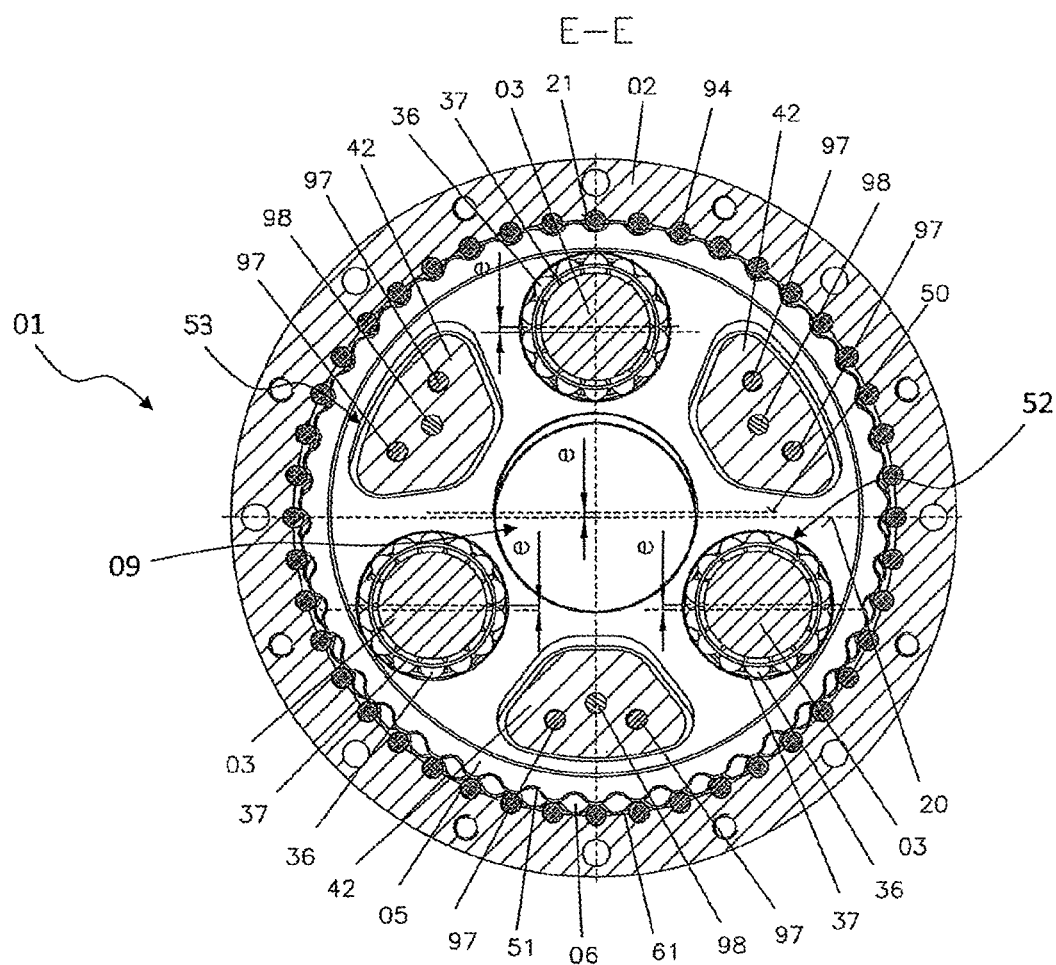
Figure 6:
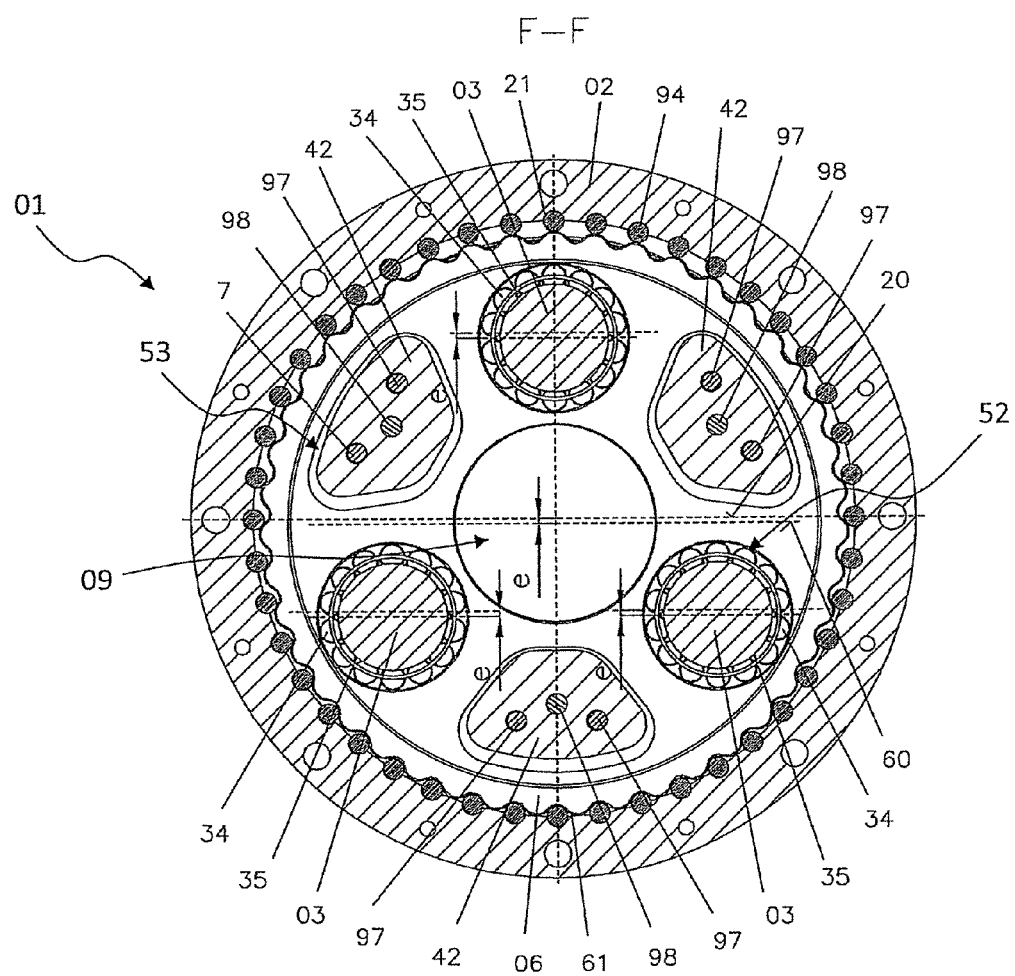
Figure 7:
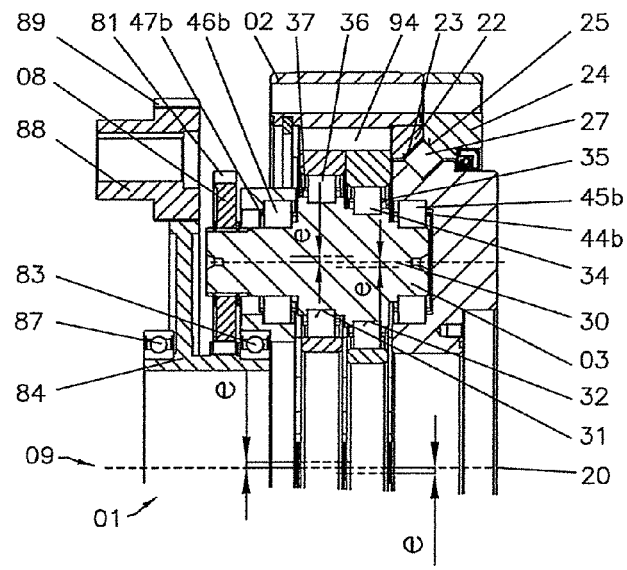
Figure 8:
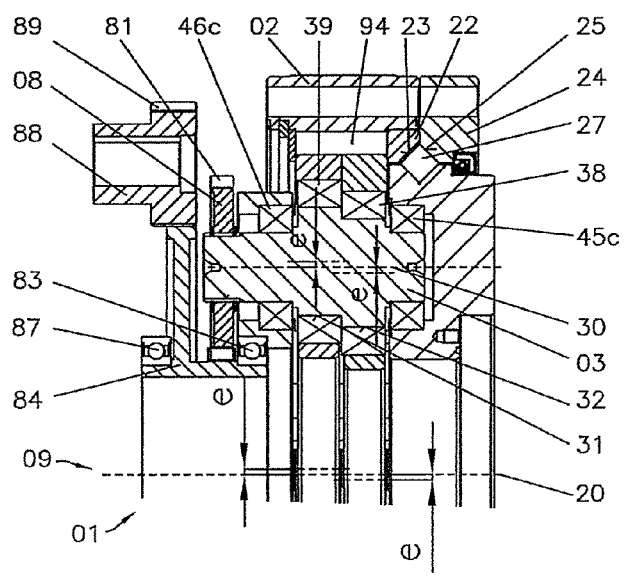
Figure 9:
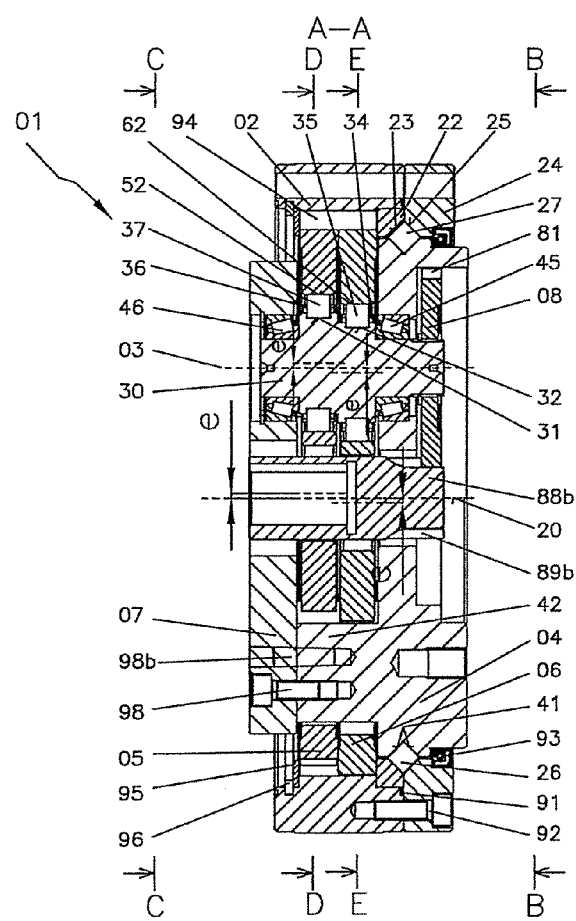
Figure 10:
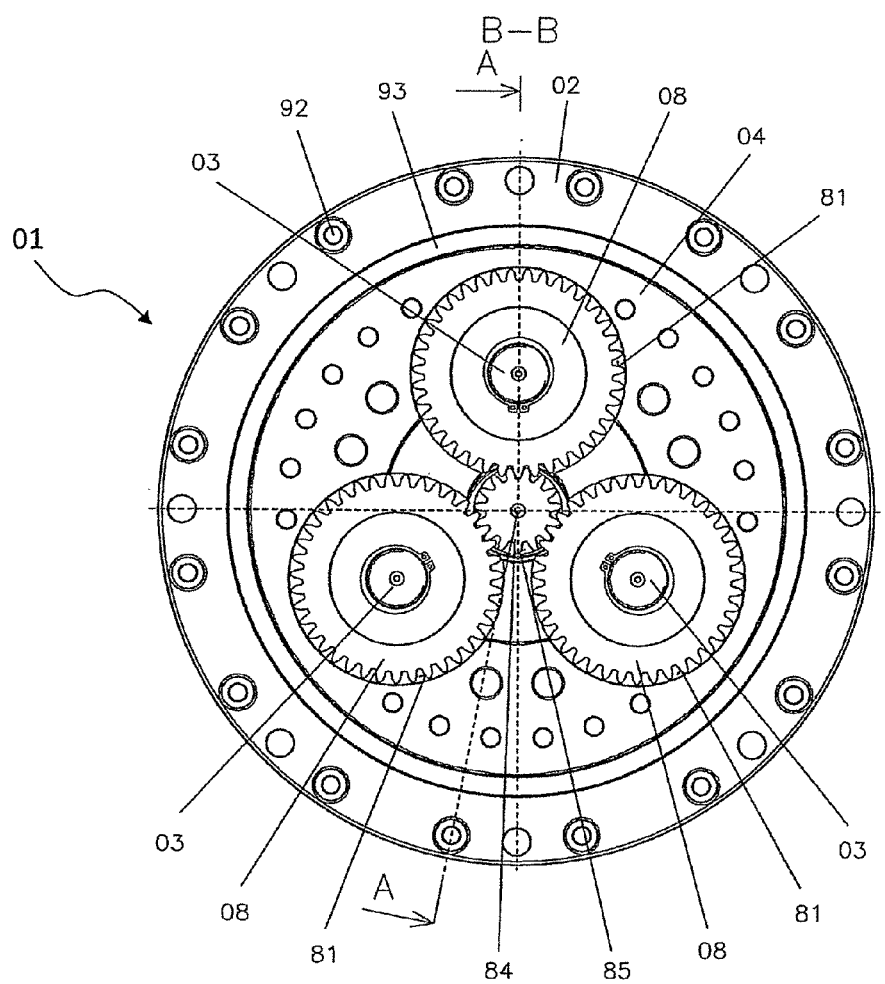
Figure 11:
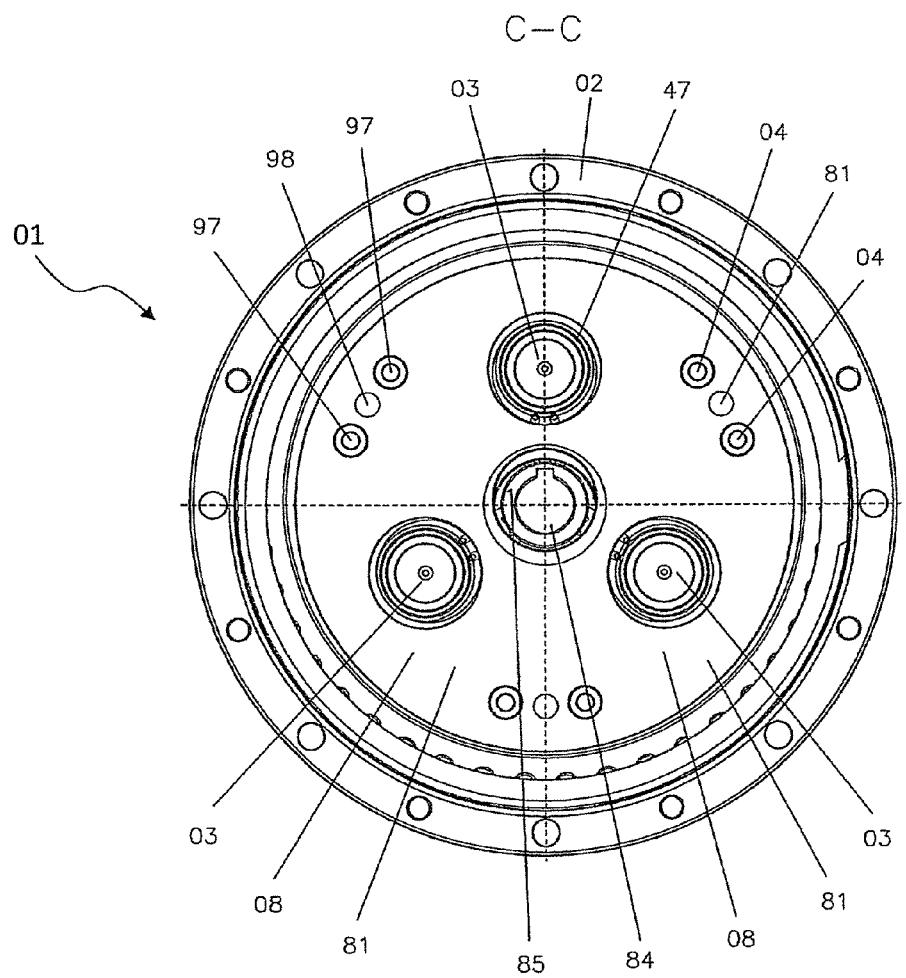
Figure 12:
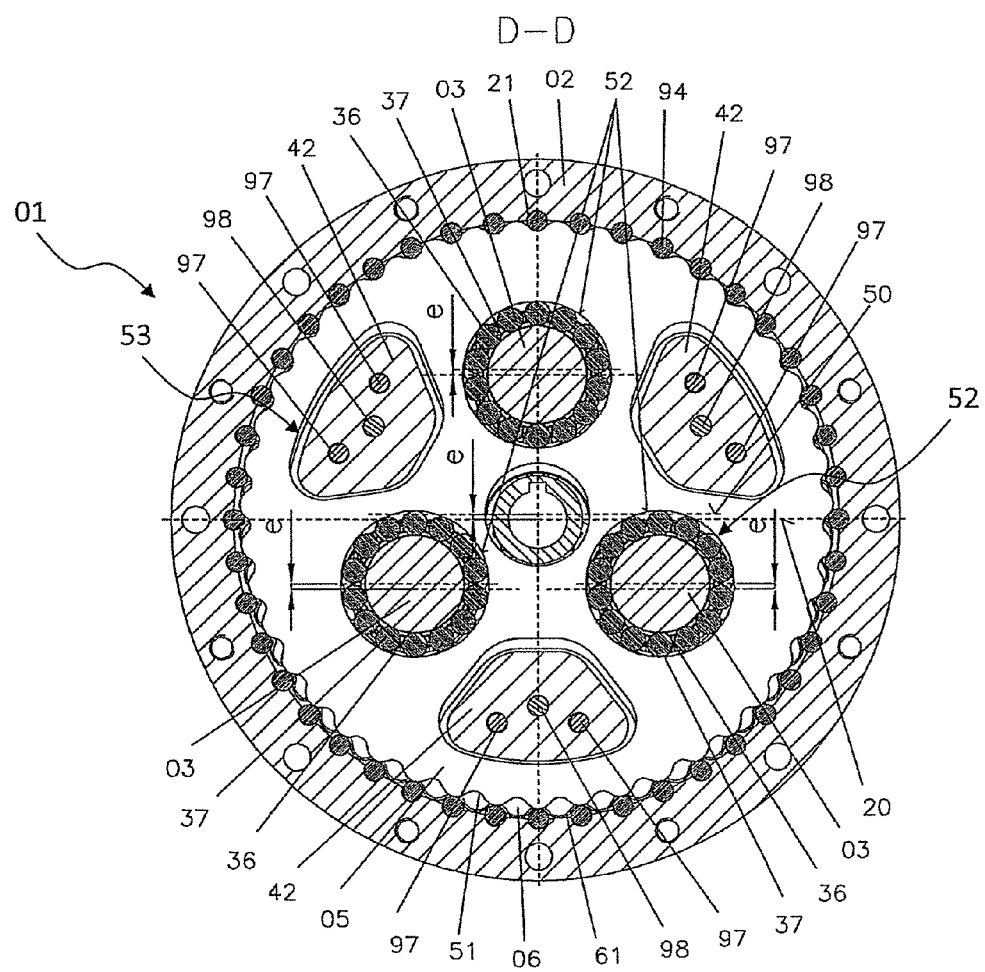
Figure 13:
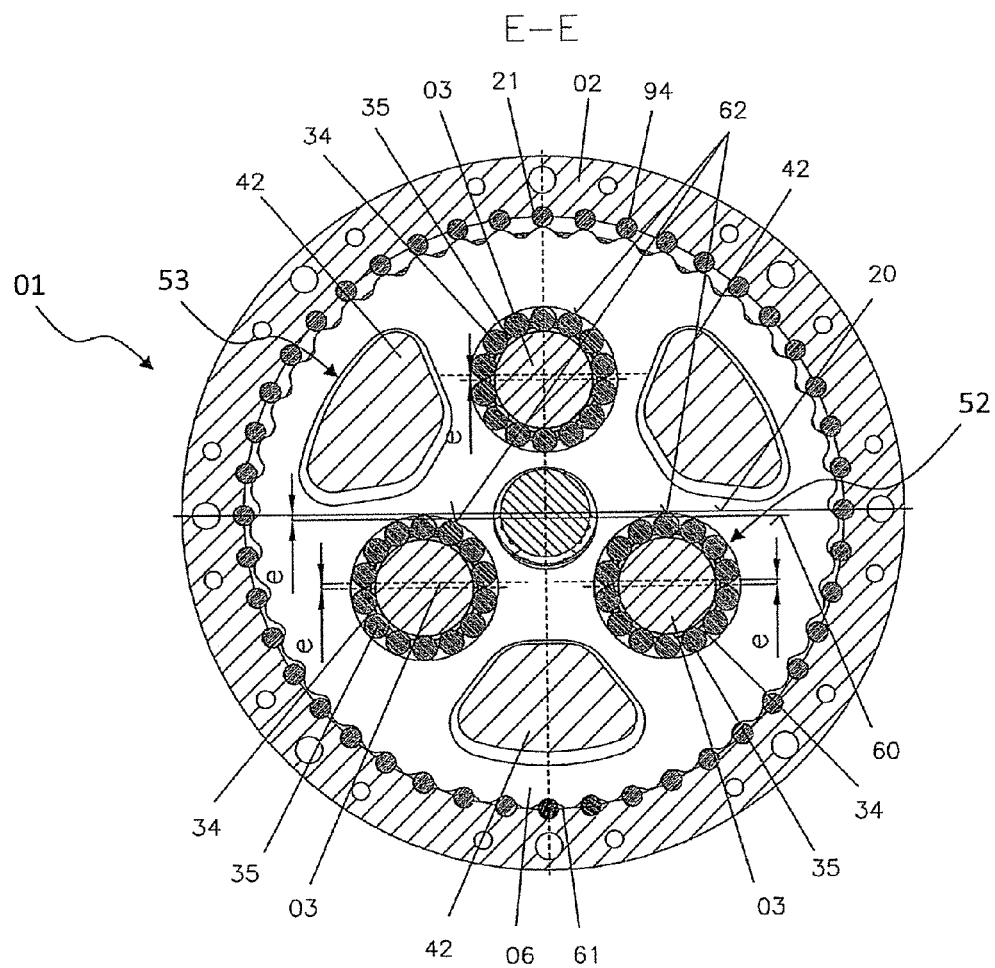
Figure 14:
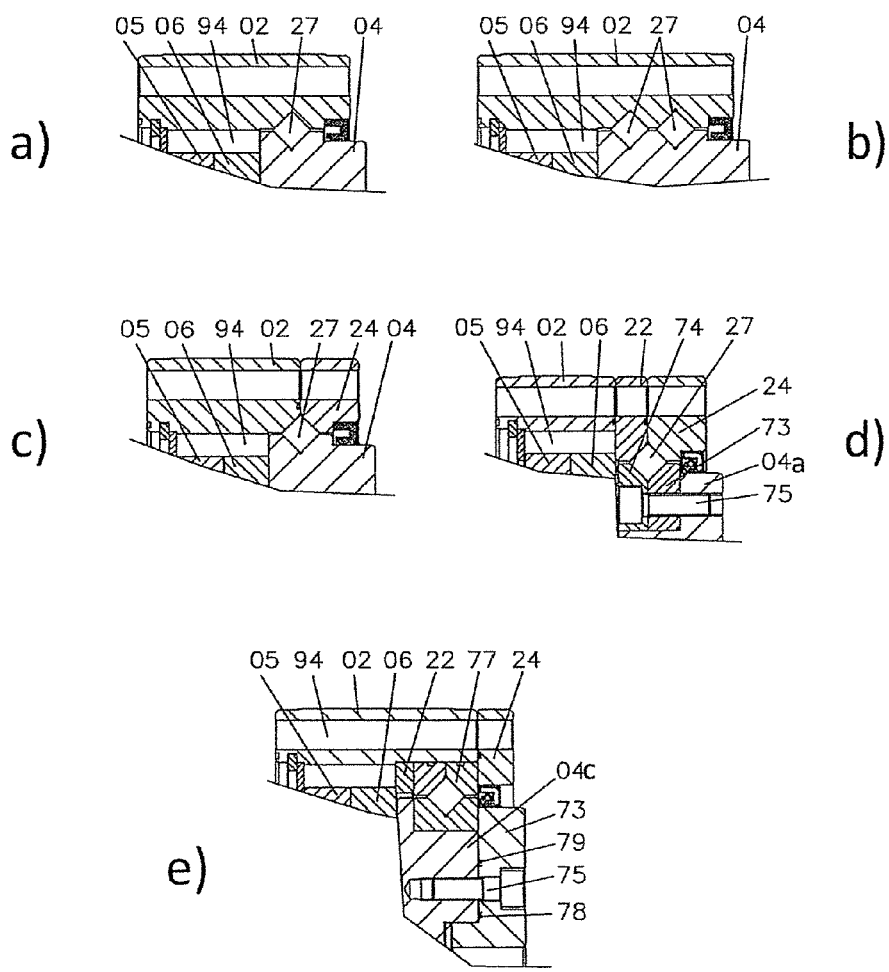
Figure 14:
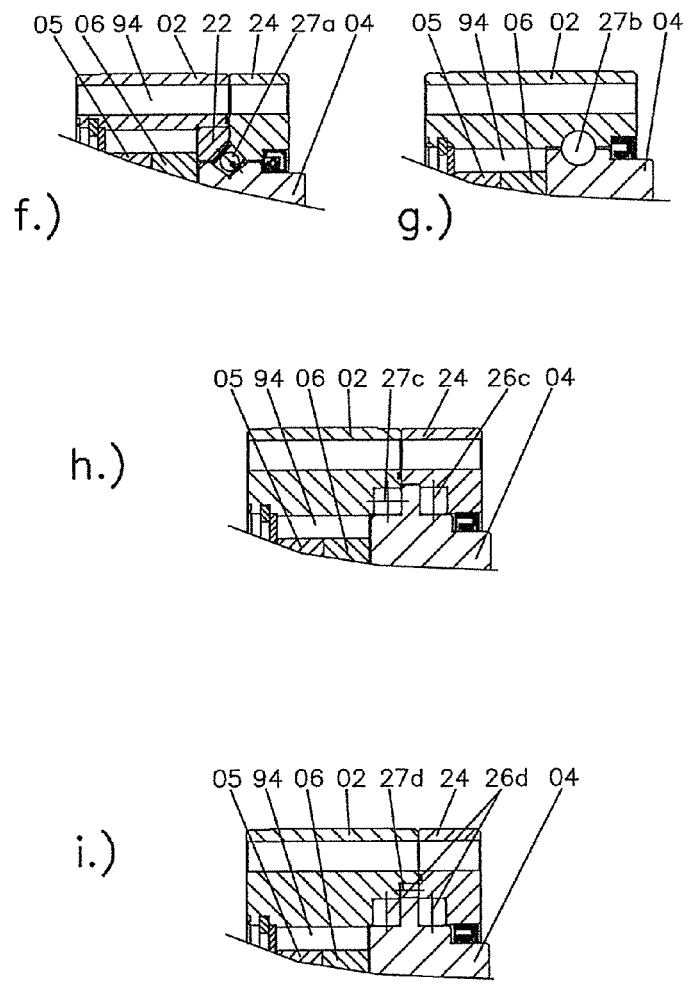
Figures 15, 15A:
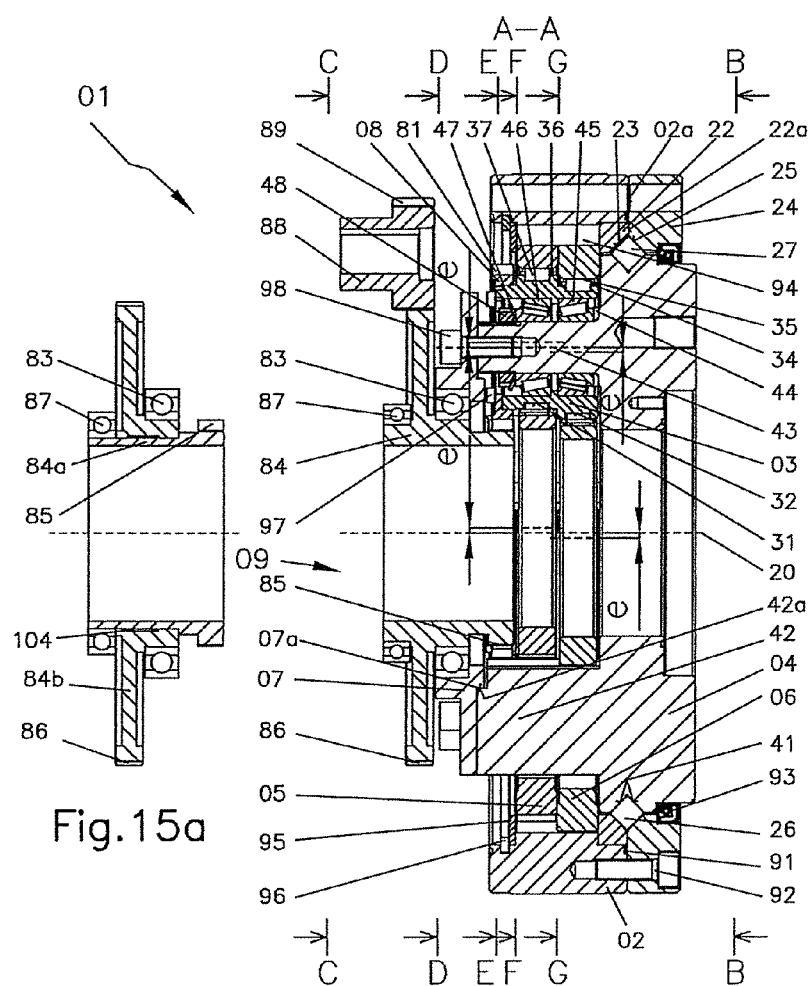
Figure 16:
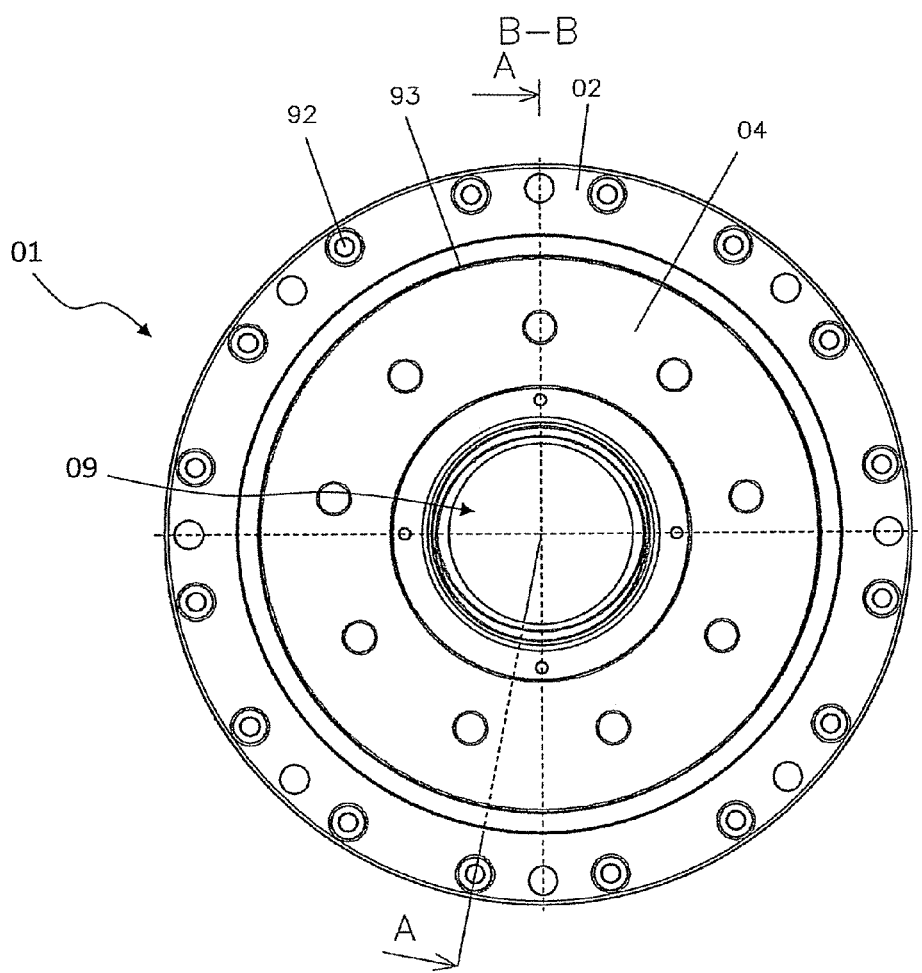
Figure 17:
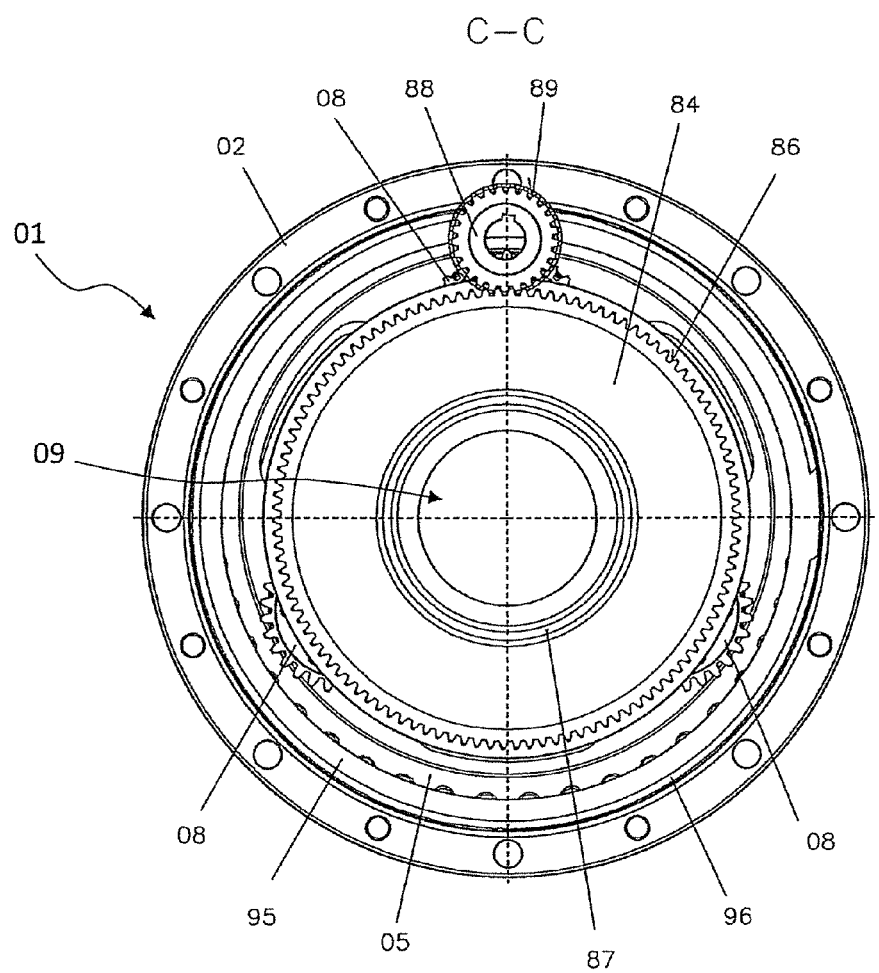
Figure 18:
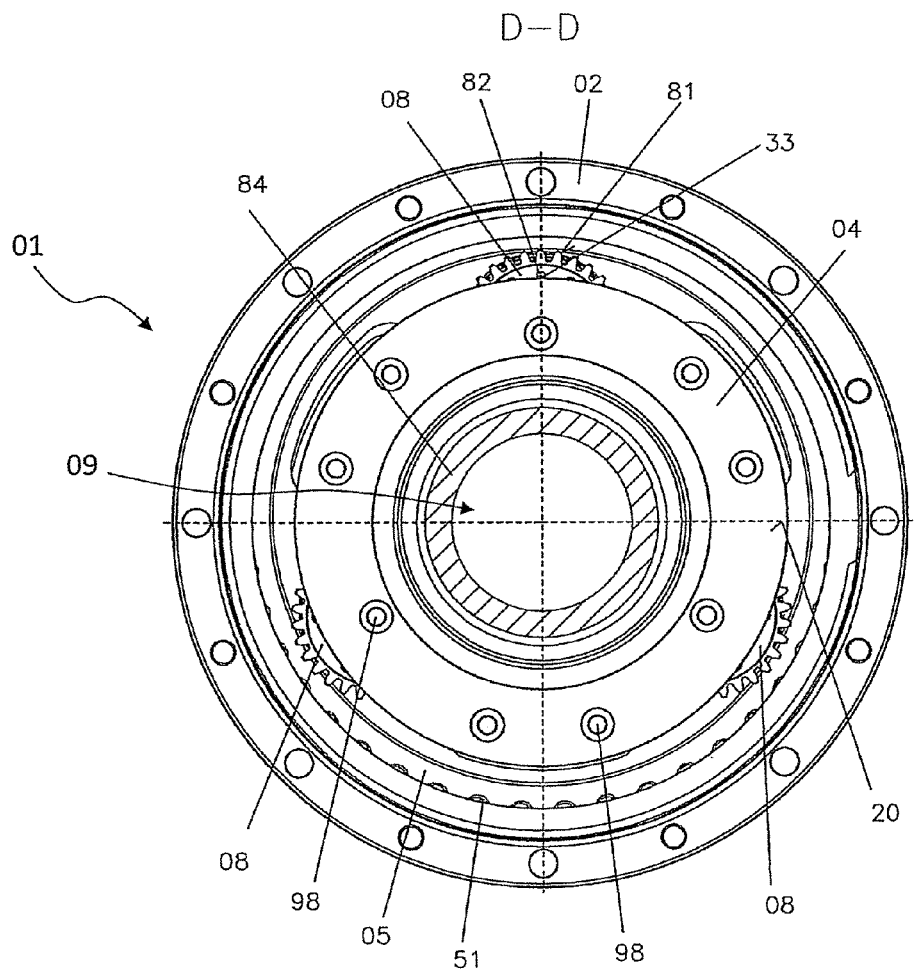
Figure 19:
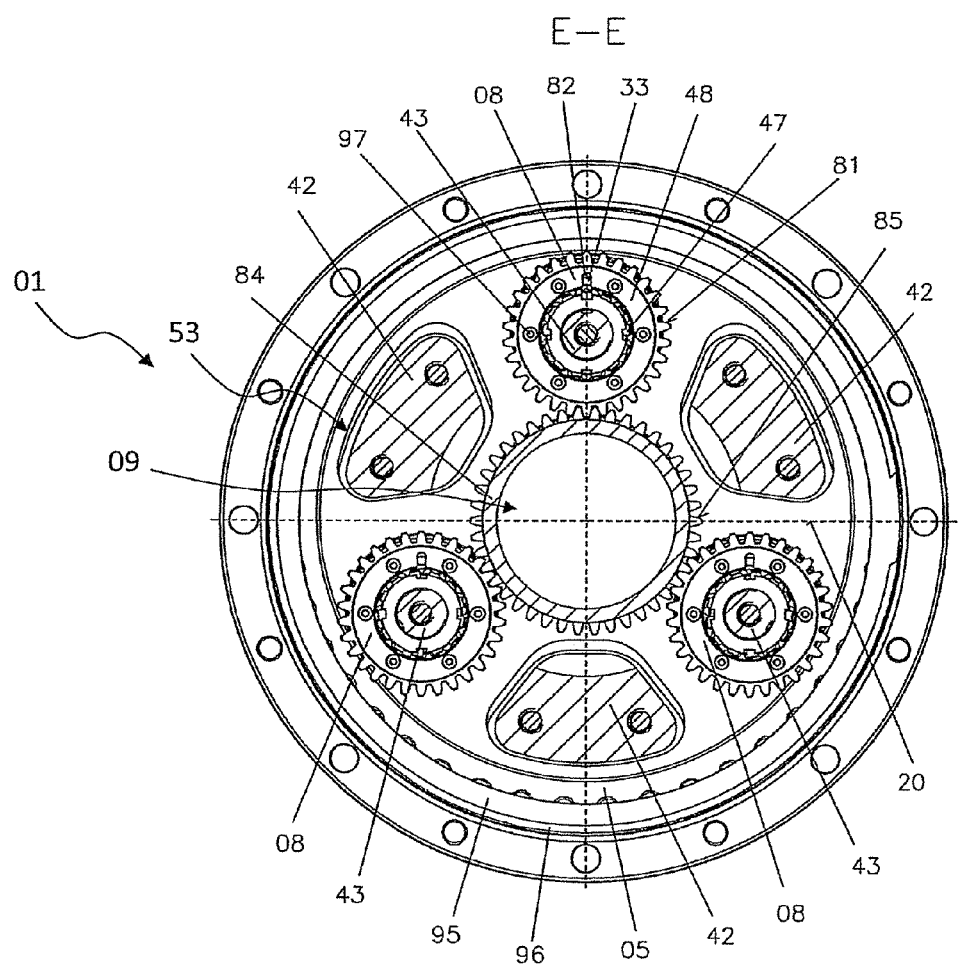
Figure 20:
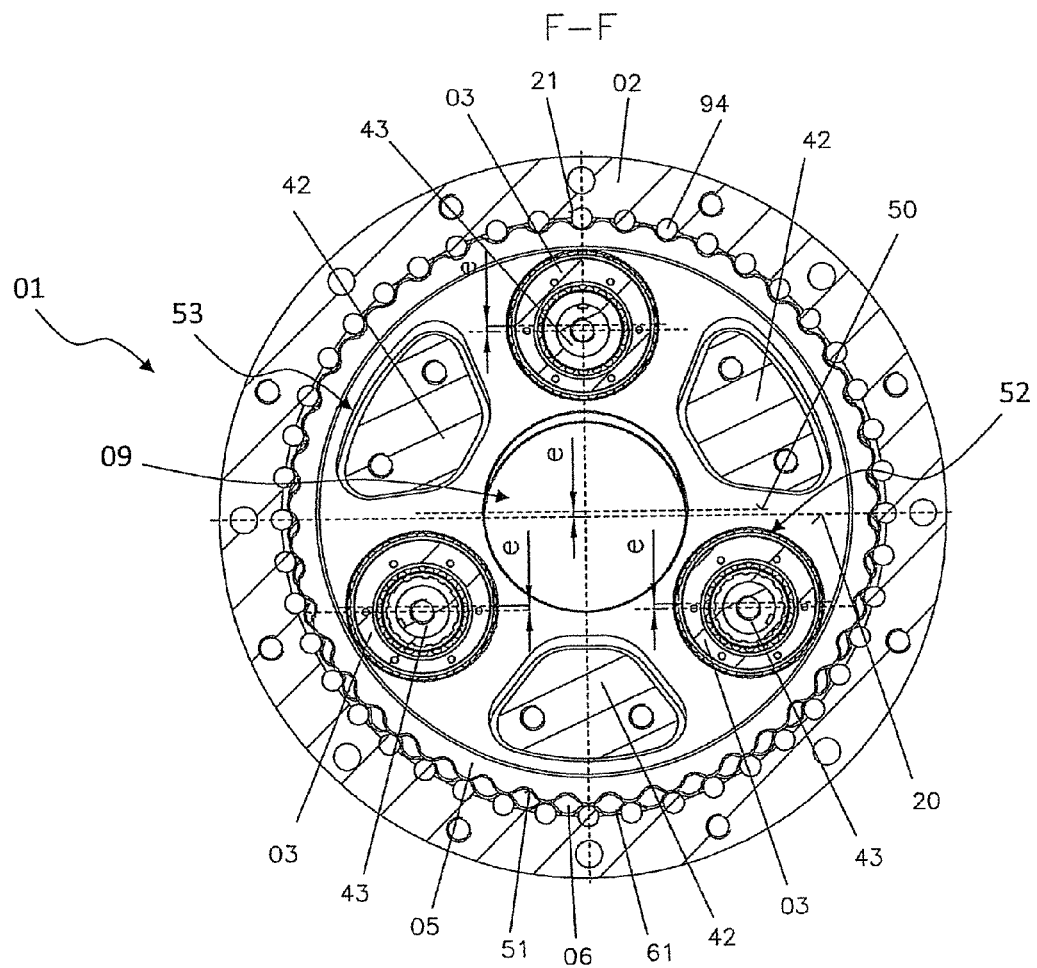
Figure 21:
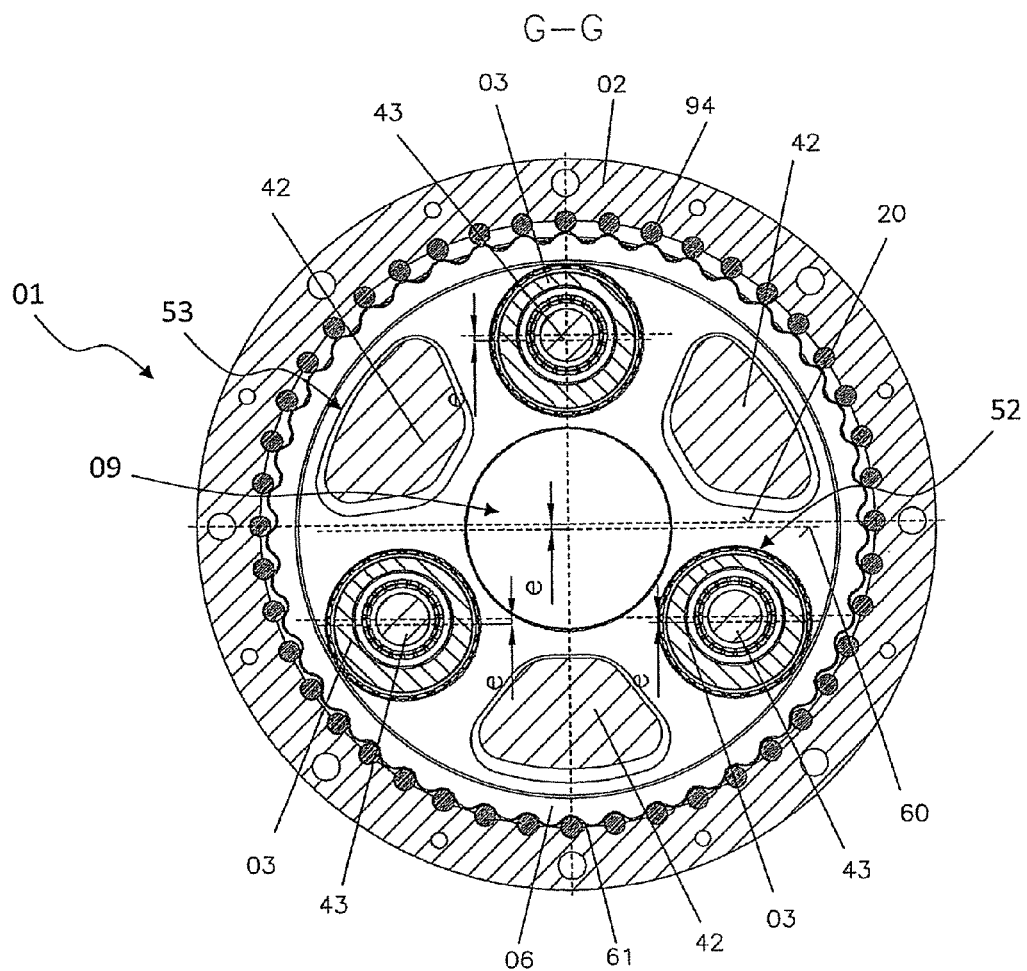
Figure 22:
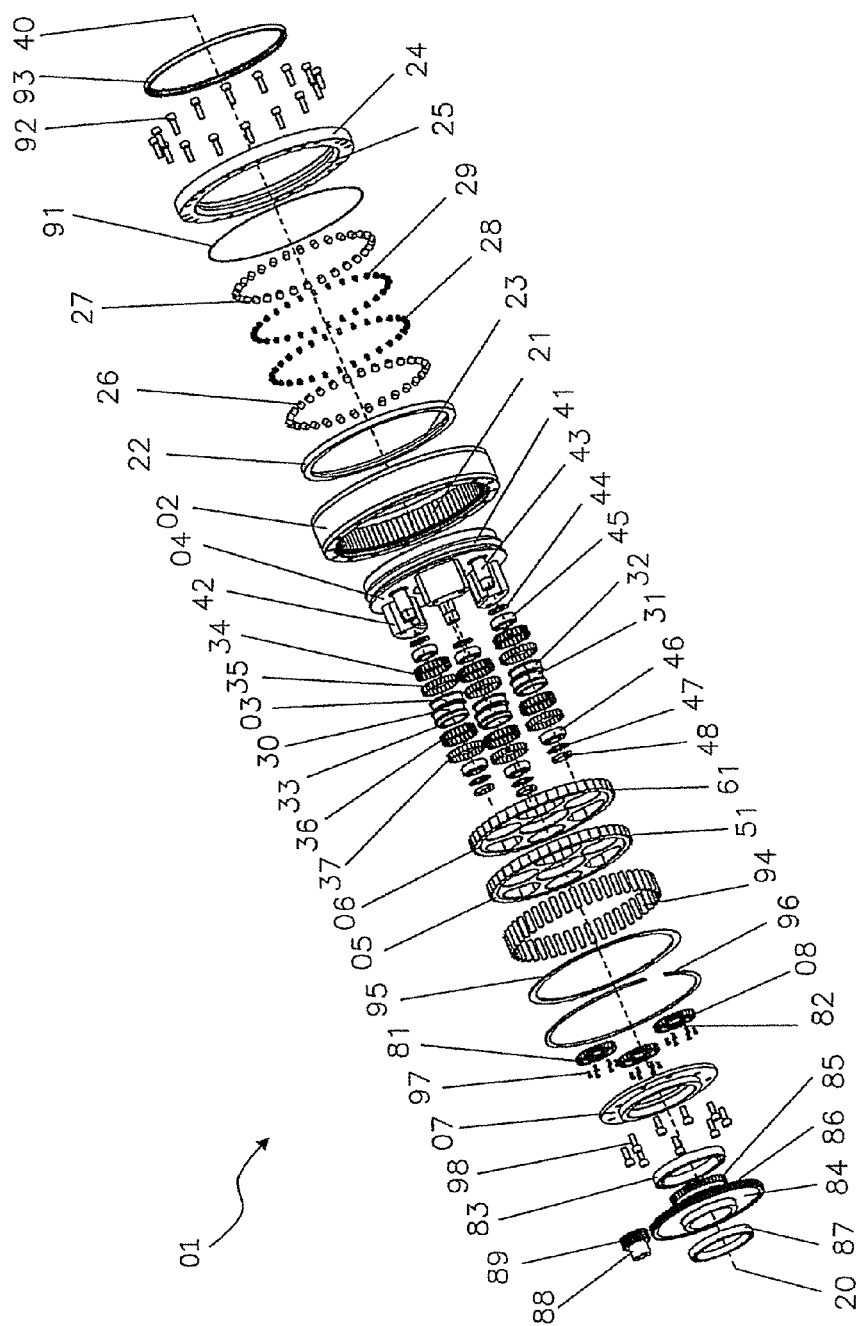
Figure 23:
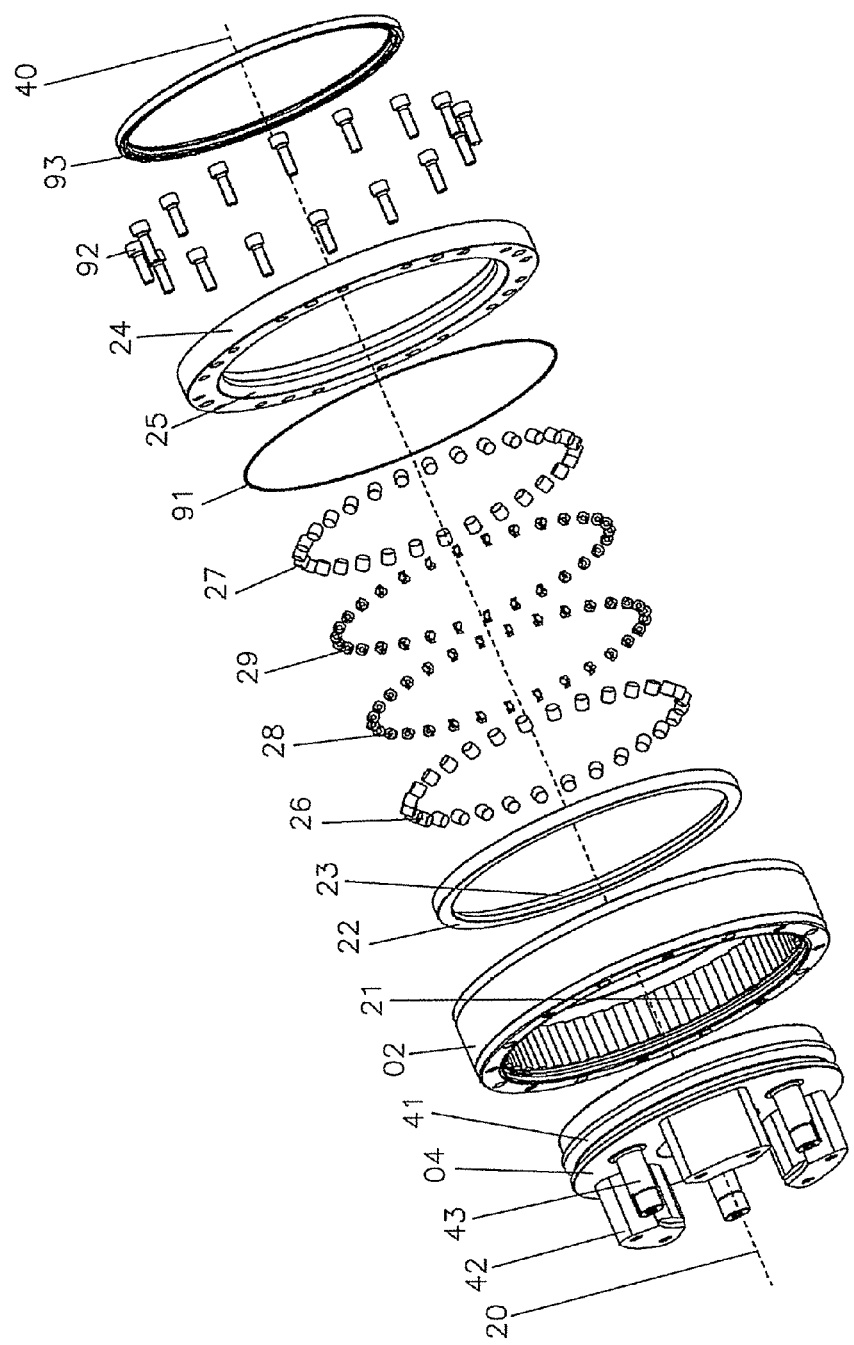
Figure 24:
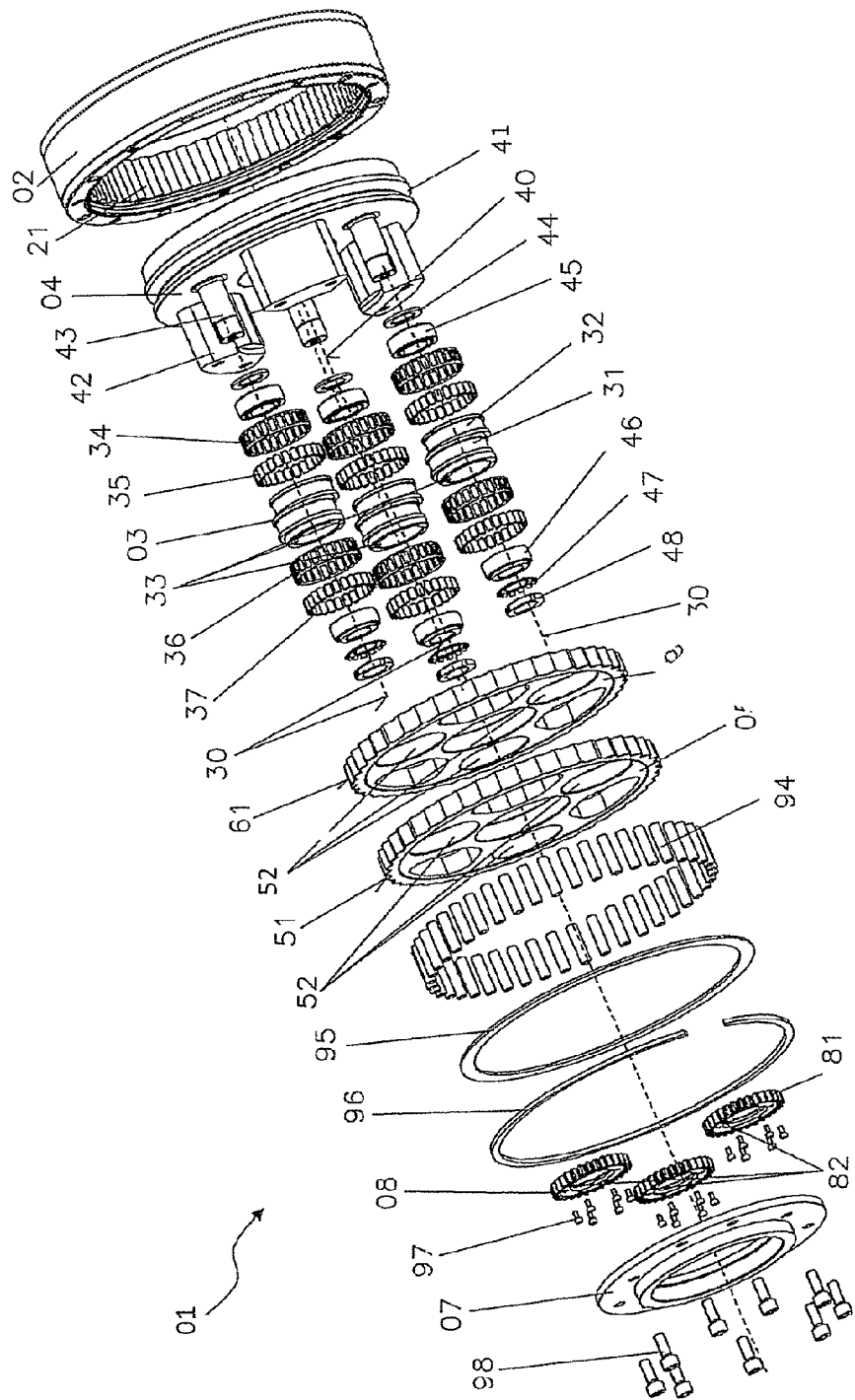
Figure 25:
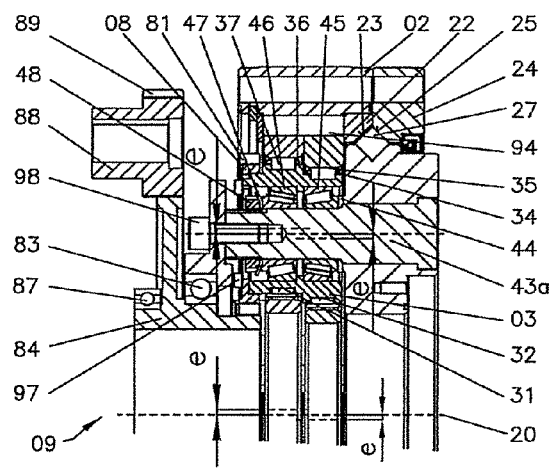
Figure 26:
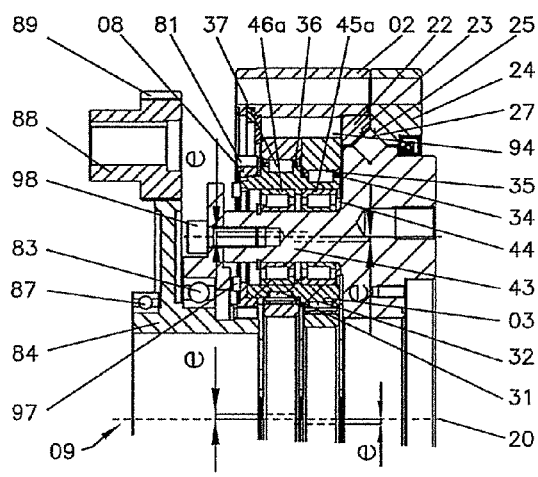
Figure 27:
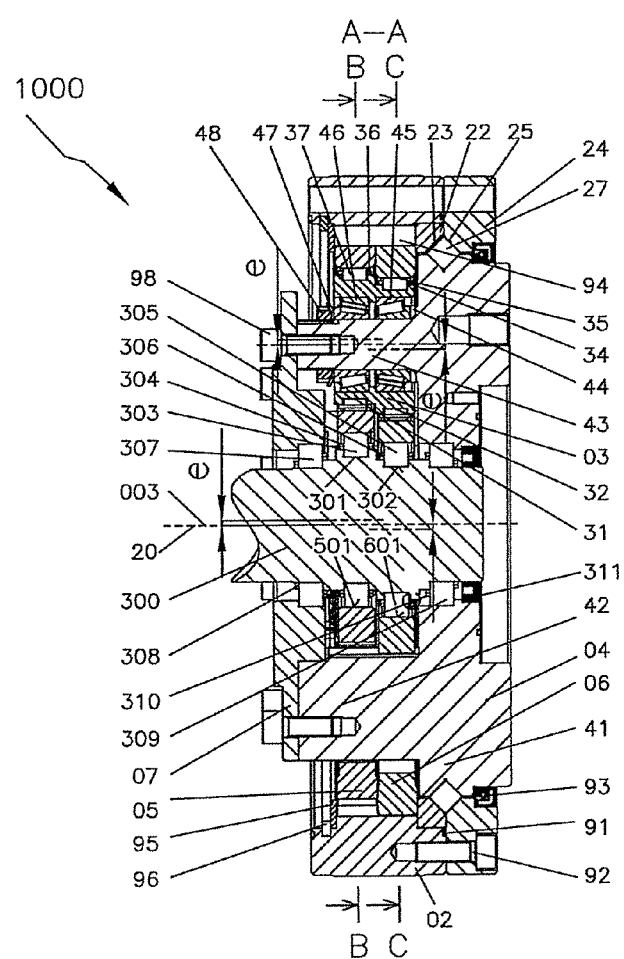
Figure 28:
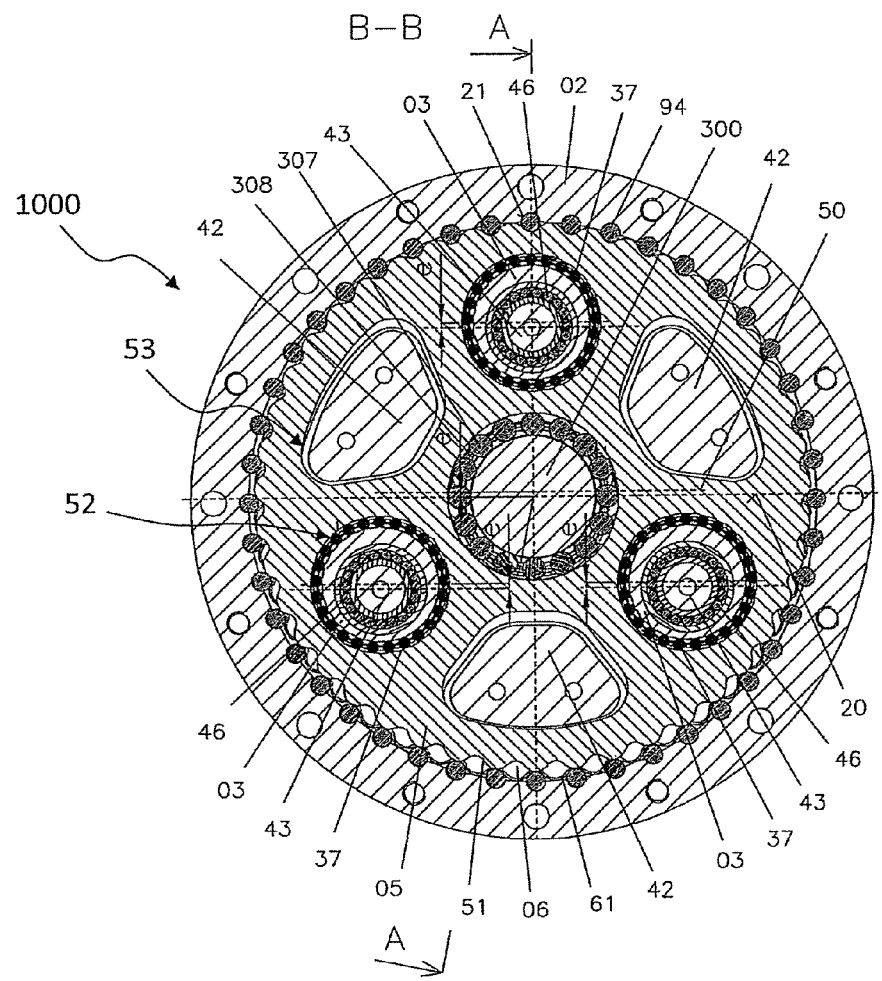
Figure 29:
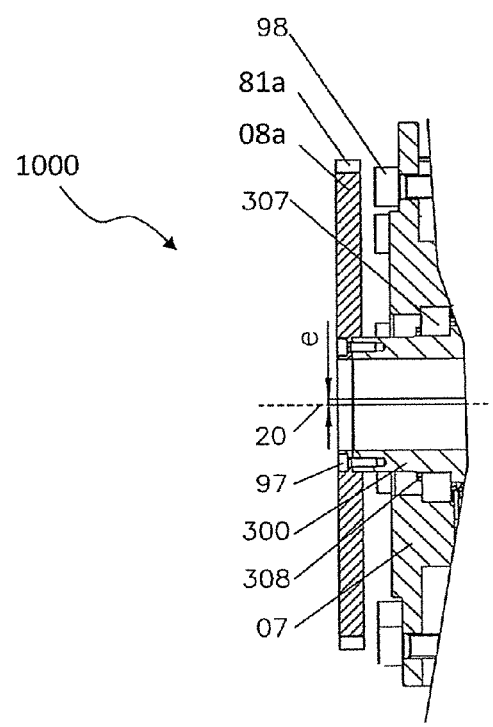
Figure 30:
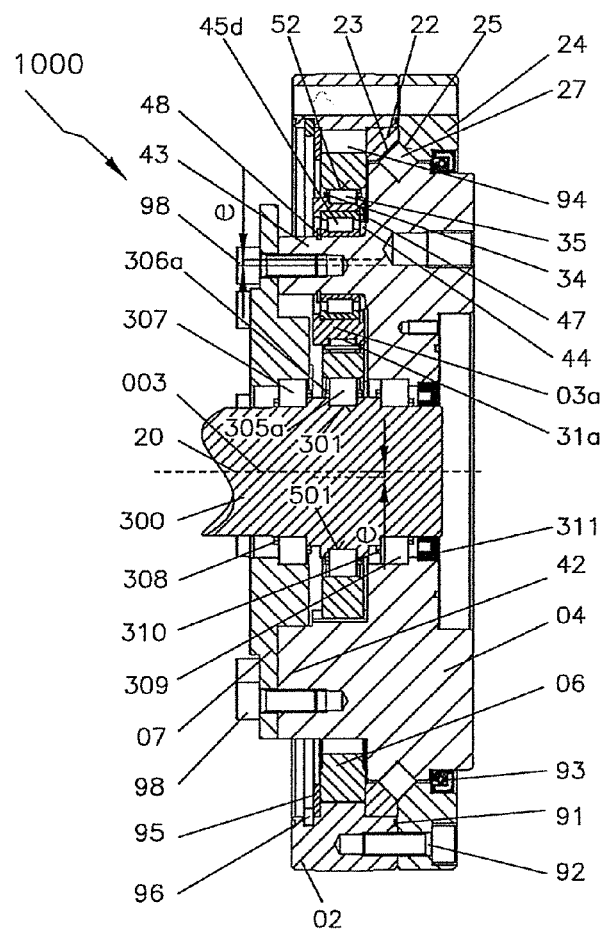

The invention will be explained in further detail below in conjunction with exemplary embodiments shown in the drawing. The size relationships of the various elements to one another in the drawings are not always true size relationships, since some shapes are simplified and other shapes for better illustration are shown enlarged relative to other elements. For elements of the invention that are the same or function the same, identical reference numerals will be used. Furthermore, for the sake of clarity, reference numerals are shown in the individual figures only as required for the description of the particular figure. The embodiments shown are merely examples for how the invention can be designed and do not represent any conclusive limitation. The drawings schematically show the following:

FIG. 1, a first exemplary embodiment of a transmission in a longitudinal section along the line A-A in FIG. 2;

FIG. 2, the transmission of FIG. 1 in a cross section extending along the line B-B;

FIG. 3, the transmission of FIG. 1 in a cross section extending along the line C-C;

FIG. 4, the transmission of FIG. 1 in a cross section extending along the line D-D;

FIG. 5, the transmission of FIG. 1 in a cross section extending along the line E-E;

FIG. 6, the transmission of FIG. 1 in a cross section extending along the line F-F;

FIG. 7, a detail view of a second exemplary embodiment of a transmission in longitudinal section;

FIG. 8, a detail view of a third exemplary embodiment of a transmission in a longitudinal section;

FIG. 9, a fourth exemplary embodiment of a transmission in a longitudinal section along the line A-A in FIG. 10;

FIG. 10, the transmission of FIG. 9 in a cross section extending along the line B-B;

FIG. 11, the transmission of FIG. 9 in a cross section extending along the line C-C;

FIG. 12, the transmission of FIG. 9 in a cross section extending along the line D-D;

FIG. 13, the transmission of FIG. 9 in a cross section extending along the line E-E;

FIG. 14, various embodiments of details such as bearing of a transmission;

FIG. 15, a fifth exemplary embodiment of a transmission in a longitudinal section along the line A-A in FIG. 16, with a detail view of a two-block displacement version in FIG. 15a seen in a longitudinal section;

FIG. 16, the transmission of FIG. 15, in a cross section extending along the line B-B;

FIG. 17, the transmission of FIG. 15, in a cross section extending along the line C-C;

FIG. 18, the transmission of FIG. 15, in a cross section extending along the line D-D;

FIG. 19, the transmission of FIG. 15, in a cross section extending along the line E-E;

FIG. 20, the transmission of FIG. 15, in a cross section extending along the line F-F;

FIG. 21, the transmission of FIG. 15, in a cross section extending along the line G-G;

FIG. 22, the transmission of FIG. 15 in an exploded view;

FIG. 23, a first detail view of the exploded view in FIG. 22 of the transmission of FIG. 15;

FIG. 24, a second detail view of the exploded view in FIG. 22 of the transmission of FIG. 15;

FIG. 25, a detail view of a sixth exemplary embodiment of a transmission in a longitudinal section;

FIG. 26, a detail view of a seventh exemplary embodiment of a transmission in a longitudinal section;

FIG. 27, a transmission in a longitudinal section along the line A-A in FIG. 28;

FIG. 28, the transmission of FIG. 27 in a longitudinal section extending along the line B-B in FIG. 28;

FIG. 29, a detail view of a transmission in a longitudinal section;

FIG. 30, a detail view of a transmission in a longitudinal section; and

Figure 31:
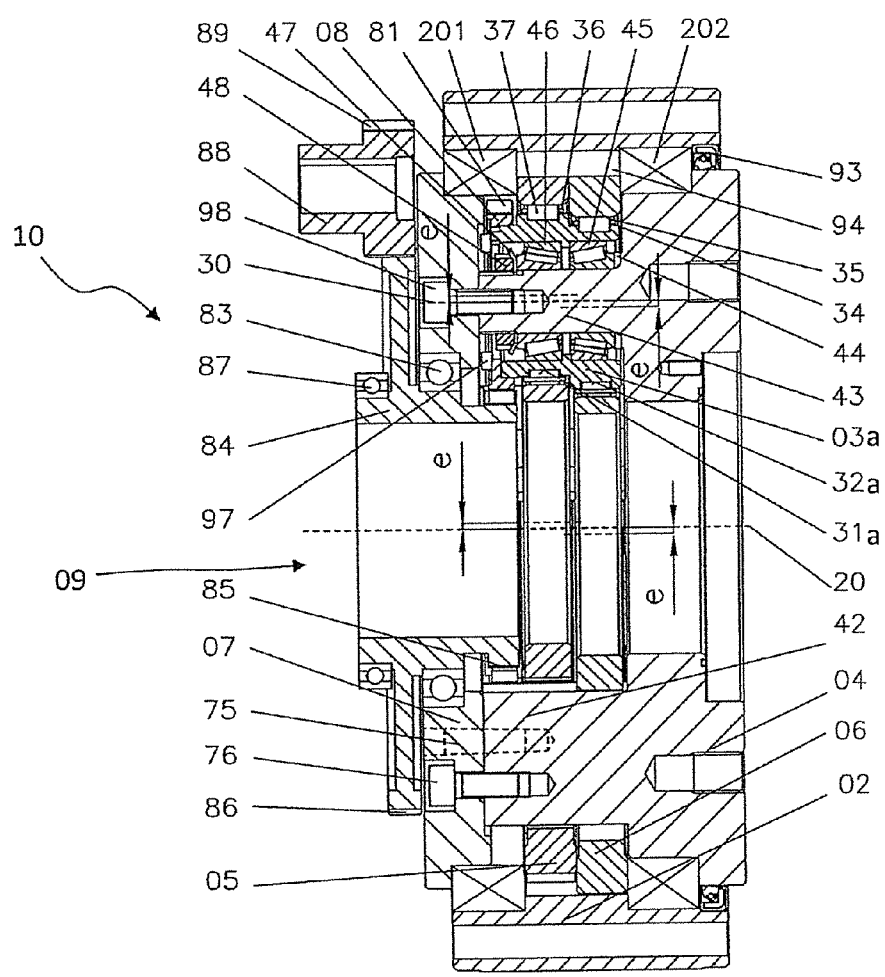

FIG. 31, a transmission in a longitudinal section.

A multi-speed transmission 01, shown entirely or in parts in FIGS. 1 through 26, and a transmission 10 shown in FIG. 31 includes a planetary gear stage and a cycloidal gear stage.

The planetary gear stage is equipped with a sun wheel 84 and at least one planet wheel 08.

The cycloidal gear stage is equipped with a ring gear 02 that extends along and is coaxial to a ring gear axis 20, at least one cycloidal disk 05, 06 rolling in the ring gear, and a number of off-center eccentric shafts 03 equivalent to the number of planet wheels 08.

The off-center eccentric shafts 03 are located jointly rotatably around the ring gear axis 20.

Each of the off-center eccentric shafts 03 has a number of eccentric portions 31, 32 equivalent to the number of cycloidal disks 05, 06, with which eccentric portions the off-center eccentric shafts 03 are rotatably supported each in one off-center opening of the at least one cycloidal disk 05, 06.

Each cycloidal disk 05, 06 has a number of off-center openings 52, 53 equivalent at least to the number of off-center eccentric shafts 03 of the transmission 01.

At least one number of off-center openings 52, equivalent to the number of off-center eccentric shafts 03 of the transmission 01, is provided for rotatable bearing of the off-center eccentric shafts 03 with their eccentric portions 31, 32 in each cycloidal disk 05, 06.

Each of the off-center eccentric shafts 03 corresponding in their number to the number of planet wheels 08 is connected nonrotatably to one planet wheel 08.

Accordingly, the invention relates to a multi-speed transmission 01 having a planetary gear stage with a sun wheel 84 and at least one planet wheel 08 and a cycloidal gear stage with a ring gear 02 that has a ring gear axis 20, at least one cycloidal disk 05, 06 rolling therein, and at least one off-center opening and a number, equivalent to the number of planet wheels 08, of off-center eccentric shafts 03, located jointly rotatably around the ring gear axis 20 and each connected nonrotatably to one planet wheel 08, with a number of eccentric portions 31, 32, equivalent to the number of cycloidal disks 05, 06, which eccentric portions are supported rotatably each in an off-center opening of the at least one cycloidal disk 05, 06.

The transmission 01 is distinguished by a bearing of its gear stages relative to the ring gear 02, which for instance forms at least one part of its machine frame and is or can also be known as a support body, with bearing elements 26, 27 located exclusively on one side of the ring gear 02.

The off-center eccentric shafts 03 can form elements which, as the cycloidal disks roll in the ring gear 02, convert the motions of the cycloidal disks into a rotary motion, for instance their own rotary motion and/or a rotary motion of a rotary body about the ring gear axis 20.

The machine frame is the sum of all the supporting parts of the transmission 01 that forms a complex machine element. In particular, via bearings, it supports the moving machine parts. The ring gear axis 20 of the ring gear 02 here extends parallel to the axes 30 of the off-center eccentric shafts 03.

First molding surfaces 33 can be formed on the off-center eccentric shafts 03 and are oriented opposite the eccentric portions 31 and 32, formed by the eccentric faces, of the off-center eccentric shafts 03 (FIG. 1, FIG. 18, FIG. 19, FIG. 22, and FIG. 24).

Planet wheels 08 are mounted with a tooth system 81 on the off-center eccentric shafts 03. Preferably, via the second molding surfaces 82 on the planet wheels 08 and called "molds" for short, the planet wheels 08 mesh with the first molding surfaces 33 on the off-center eccentric shafts 03. As a result, their identical orientation relative to the eccentric faces 31 and 32 of the off-center eccentric shafts 03 is ensured (FIG. 18, FIG. 19, FIG. 22, and FIG. 24).

Mounting the planet wheels 08 on the eccentric shafts 03 is made vastly simpler as a result. An axial measurement or definition of the rotary positions of the planet wheels 08 relative to the eccentric shafts 03 with their eccentric portions 31, 32 is automatically done upon installation by fitting the eccentric shaft 03 and planet wheel 08 one inside the other while fitting the first and second molding surfaces 33, 82 one inside the other. An ensuing securing against loosening in the axial direction can be done by simple fastening means, such as screws 97.

Hence for the first time the prerequisite for furnishing an exact alignment of planet wheels 08 in their rotary position relative to eccentric portions 31, 32 of eccentric shafts 03 connected to the planet wheels 08 nonrotatably is achieved, whereby as an example a multi-speed transmission including a cycloidal gear stage and a planetary gear stage can be produced at reasonable cost for assembly.

For instance, one such multi-speed transmission, by the exact alignment of planet wheels 08 in its rotary position relative to eccentric portions 31, 32 of eccentric shafts 03 connected nonrotatably to the planet wheels 08, can be equipped at reasonable installation expense with a central eccentric shaft 300 with a number of eccentric portions 301, 302 equivalent to the number of cycloidal disks 05, 06, on each of which eccentric portions a cycloidal disk 05, 06 is rotatably located. Without the exact alignment, there would be the risk that a simultaneous drive of off-center eccentric shafts 03 and the central eccentric shaft 300 would lead to warping and thus cause the transmission to jam, if the motions of the central and off-center eccentric shafts 03, 300 are not coordinated exactly. This kind of coordination is ensured by the exact alignment of the relative rotary positions of planet wheels 08 and eccentric shafts 03 by means of the first and second molding surfaces 33, 82.

The exact alignment furthermore helps to avert such instances of unwanted warping in the transmissions described, which are moreover equipped with a wheel 84 that is connected nonrotatably to the central eccentric shaft 300.

The transmission 01 can include roller elements 94, which are located in the ring gear 02 and with which the cycloidal disks 05, 06 rolling in them mesh on their outer circumference. As shown in FIG. 1, FIG. 9, FIG. 15, FIG. 22, FIG. 24, and FIG. 27, the roller elements 94 can be secured in the direction parallel to the ring gear axis 20 by means of at least one ring 95, 96.

This arrangement can for instance involve a first closed ring 95, which touches the roller elements 94 directly, and a second ring 96 securing the first ring against falling out; the second ring can advantageously be embodied as a spring ring that engages a groove. This arrangement, first with an entirely closed circumferential first ring 95 that comes into contact with the roller elements 94, and then with a second spring ring, especially advantageously a Seger ring, that engages a groove machined into the inner circumferential surface of the ring gear 02, makes it possible to secure the roller elements 94 reliably against falling out in the direction of the ring gear axis 20 while at the same time making for especially simple assembly.

It should be emphasized as being especially advantageous that the ring or rings 95, 96, by suitable dimensioning especially of the ring 95, can simultaneously secure the cycloidal disks 05, 06 in the ring gear 02, which once again simplifies assembly.

The transmission 01 can, as illustrated by the example of a transmission 1000 in FIG. 27, FIG. 28, FIG. 29, and FIG. 30, include a central eccentric shaft 30 that has a number of eccentric portions 301, 302 equivalent to the number of cycloidal disks 05, 06. One cycloidal disk 05, 06, for instance with a central opening 501, 601 provided for the purpose, is located rotatably on each of these portions.

The ring gear axis 20 of the ring gear 02 here is identical to the axis 003 of the central eccentric shaft 300. In other words, the ring gear 02 is located coaxially to the axis 003 of the central eccentric shaft 300.

The transmission 01 can have a wheel 84, which is connected nonrotatably to an optionally provided central eccentric shaft 300.

Via this wheel 84, the transmission 01 can be driven (FIG. 29).

For the sake of completeness it is mentioned that the transmission 01, 1000 can also be driven directly via the central eccentric shaft 300.

Alternatively or in addition, the transmission 01 can have elements 42 which are located revolving jointly around the ring gear axis 20, which elements extend through off-center openings 53 of the at least one cycloidal disk 05, 06.

To reinforce the fastening onto the rotary body 04 of a flange 07 connected nonrotatably to the rotary body 04, the elements 42 can serve to increase the stiffness of this connection.

Furthermore, the elements 42 alone or for example in addition to extensions 43, on which the off-center eccentric shafts are rotatably supported, can serve to convert the motions of the at least one cycloidal disk 05, 06, as it rolls in the ring gear 02, into a rotary motion for instance of a rotary body 04, connected to the elements 42, around the ring gear axis 20 of the ring gear 02.

Preferably, the support formed for example by bearing elements 26, 27, with which support the transmission stages of the transmission 01 are supported exclusively on one side opposite the ring gear 02, on the side of the ring gear 02 facing away from the planetary gear stage. In the case of a support formed by bearing elements 26, 27, the bearing elements 26, 27 with which the transmission stages of the transmission 01 are supported exclusively on one side opposite the ring gear 02 are accordingly located on the side of the ring gear 02 facing away from the planetary gear stage.

The transmission 01 can include an additional gear stage, as shown in FIG. 1, FIG. 7, FIG. 8, FIG. 15, FIG. 22, FIG. 25, FIG. 26, and FIG. 31 for a transmission 10.

The additional gear stage can include a pinion 86 in engagement with the sun wheel 84 or planetary gear stage or with a wheel connected nonrotatably thereto (FIG. 1, FIG. 7, FIG. 8, FIG. 15, FIG. 22, FIG. 25, FIG. 26, FIG. 31).

Accordingly, the multi-speed transmission 01 including a combination of cycloidal gears and planetary gears can include a third spur gear, which forms a third gear stage, advantageously for example a pinion 88 meshing with the sun wheel 84 on the part of the planetary gear or with a spur wheel connected nonrotatably to the sun wheel 84.

Alternatively, the sun wheel 84 of the transmission 01 can be formed directly by a pinion 88 of a shaft extending coaxially to the ring gear axis 20 (FIG. 9).

The transmission 01 can have a central through opening extending along the ring gear axis 20 of the ring gear 02.

The off-center eccentric shafts 03 of the cycloidal gear stage of the transmission 01 can be located rotatably on an already-mentioned rotary body 04. The rotary body 04 itself is located here rotatably on the ring gear 02, around the ring gear axis 20.

The optionally provided rotary body 04 of the transmission 01 can include an already-mentioned flange 07 connected to it nonrotatably.

The rotary body 04 is accordingly embodied in at least two parts and includes, along with a base body for instance forming an inlet flange, additionally the flange 07 forming an outlet flange. Accordingly, the base body and the flange 07 are parts of the rotary body 04 rotatably supported on the ring gear 02 around the ring gear axis 20.

It is important to stress here that the transmission 01, as shown in FIG. 15, or a transmission 1000 or a transmission 10, can provide a systematic connection of the flange 07 with the rotary body 04. This systematic connection simplifies the assembly of the transmission 01 further.

In that case, it is provided case that protrusions 07a are embodied on the flange 07, and protrusions 42a corresponding to the protrusions 07a are embodied on the elements 42 of the rotary body 04. This makes it possible to insert the flange 07 while interlocking the protrusions 07a and the protrusions 42a on the elements 42 on the rotary body and then to screw in all the elements 42 and extensions 43 with the screws 98. The protrusions 42a here are preferably embodied only on the elements 42.

The off-center eccentric shafts 03 can be rotatably supported on the rotary body 04, for instance by means of bearing elements 45, 46 (FIG. 15, FIG. 22, FIG. 24, FIG. 25, FIG. 26, FIG. 28, and FIG. 30) that include roller elements 45b and 46b supported in cages 47b (FIG. 26).

For instance, roller elements 45b and 46b can be used directly on the off-center eccentric shafts 03, which are supported in cages 44b and 47b.

As a result, the off-center eccentric shafts 03 are supported in integrated rolling contact bearings. The bearing tracks for the roller elements 45b and 46b of the bearing elements 45, 46 are thus formed directly on the off-center eccentric shafts 03 as well as for instance on the flange 07, connected to the rotary body 04, as well as on the rotary body 04 itself, or on its base body.

As roller elements, the bearing elements 45, 46 can for instance include conical rollers (FIG. 15). Alternatively, the bearing elements 45, 46 can for instance provide cylindrical rollers 45a, 46a (FIG. 26).

These bearing elements 45 and 46 can also be embodied such that cylindrical rollers 45a, 46a, for instance fastened in cages, between the integrated bearing faces can be used, which are formed on the extensions 43 and off-center eccentric shafts 03 (FIG. 27, FIG. 28, FIG. 30, and FIG. 31).

Furthermore, roller-type rolling contact bearings 45d are also conceivable (FIG. 30).

Alternatively to a rotatable bearing of the off-center eccentric shafts 03 in the rotary body 04 (FIG. 1, FIG. 7, FIG. 8, and FIG. 9), extensions 43 extending on the rotary body 04 parallel to the ring gear axis 20 can be located off-center, and about them, the off-center eccentric shafts 03 are located, rotatably supported by their eccentric portions 31, 32 (FIG. 15, FIG. 22, FIG. 24, FIG. 25, FIG. 26, FIG. 27, FIG. 30, and FIG. 31).

The aforementioned extensions 43 can then be formed by pins inserted into the rotary body 04 (FIG. 25). This makes precise machining of the bearing faces and mass production simpler in comparison for instance to extensions 43 machined in one piece out of the rotary body 04.

The extensions 43 can alternatively or additionally to a rotatable support of the off-center eccentric shafts 03 serve to convert the motions of the one or more cycloidal disks 05, 06, as they roll in the ring gear 02, into a rotary motion of the rotary body 04 and of a flange 07 that might optionally be connected to it.

The transmission 01 can be driven via the sun wheel 84.

At least one or more parts of the invention can be realized by means of a transmission 1000 shown in FIG. 27, FIG. 28, FIG. 29, and FIG. 30.

This can for instance involve a multi-speed transmission 1000 with a spur gear stage and with a cycloidal gear stage (FIG. 29).

The spur gear stage can be equipped with both a wheel 08a, nonrotatably connected to a central eccentric shaft, for instance, and a pinion that for instance meshes with that wheel (FIG. 29).

The cycloidal gear stage can, as described above, be equipped with a ring gear 02, at least one cycloidal disk 05, 06 rolling in it with at least one off-center opening, one or more off-center eccentric shafts 03, 03a located jointly rotatably around the ring gear axis 20 of the ring gear 02, with a number of eccentric portions 31, 32, 31a, 32a equivalent to the number of cycloidal disks 05, 06 (FIG. 27, FIG. 28, FIG. 29, and FIG. 30). With each of these portions, the one or more off-center eccentric shafts 03, 03a are rotatably supported each in an off-center opening of the at least one cycloidal disk 05, 06.

Especially advantageously, a transmission 1000 and/or a multi-speed transmission 01 shown in FIG. 1, FIG. 7, FIG. 8, FIG. 9, FIG. 14 d), FIG. 14 e), FIG. 14 f), FIG. 15, FIG. 22, FIG. 23, FIG. 25, and FIG. 26, which is formed for instance by a cycloidal gear stage shown in FIG. 27, FIG. 28, FIG. 29, and FIG. 30, or includes a cycloidal gear stage shown in FIG. 27, FIG. 28, FIG. 29, and FIG. 30, or is included by a cycloidal gear stage shown in FIG. 27, FIG. 28, FIG. 29, and FIG. 30, can preferably have a groove, for instance V-shaped, that includes a first groove face 23 and a second groove face 25 and is split in two between the first groove face 23 and the second groove face 25, which groove faces 23, 25 form bearing running surfaces, located on the side toward the ring gear, for bearing elements 26, 27, such as roller bodies of the advantageously one-sided bearing.

For that purpose, it can include an outer ring, split in two, that has a first groove face 23 and a second groove face 25, which together form a groove that for instance is V-shaped. The split of the outer ring extends between the first groove face 23 and the second groove face 25.

The two grooves faces 23, 25 form the bearing running surfaces on the side toward the ring gear—called tracks for short—for bearing elements 26, 27, such as roller bodies of the one-sided bearing.

Advantageously, the transmission 01 or the transmission 1000 is distinguished by a one-sided bearing, with a V-shaped groove split in two that includes a first groove face 23 and a second groove face 25 and that is split in two between the first groove face 23 and the second groove face 25; its groove faces 23, 25 form bearing running surfaces toward the ring gear for bearing elements 26, 27, such as roller bodies of the one-sided bearing.

The one-sided bearing can for instance include an outer ring, which is split in two and located on the ring gear 02 and is provided with a groove formed by two groove faces 23, 25, and for instance V-shaped. Viewed in longitudinal section through the transmission 01 along the ring gear axis 20, the two groove faces 23, 25 form the divisible shanks of the groove, which for instance is V-shaped.

Still other cross-sectional geometries of the groove are conceivable, as long as they—in a manner akin to being able to remove injection-molded parts from a mold—can be divided by being split into two groove faces; once a part is removed, the groove is freely accessible for introducing bearing elements in the direction parallel to one axis—in this case the ring gear axis 20—about which the groove revolves.

The two-part outer ring for instance includes a first ring 22, also called an output bearing ring, which is provided with a first groove face 23, and a second ring 24, which is provided with a second groove face 25.

A separation face between the rings 22, 24 runs between the groove faces 23, 25.

A counterpart, for instance in the form of an also V-shaped groove, can be embodied for instance on an inner ring (FIG. 14 d), FIG. 14 e)) or directly on a rotary body rotatably supported about the ring gear axis in the ring gear 02 (FIG. 14 a), FIG. 14 b), FIG. 14 c)). The inner ring can be split in two (FIG. 14 d)), which intrinsically has the same advantages for the inner ring as for the outer ring.

One part of the outer ring can be formed by the ring gear 02 itself (FIG. 14 h), FIG. 14 i)).

In other words, the transmission 01, 1000 has an outer ring, split in two, with a first groove face 23 and a second groove face 25, and this outer ring is split in two between the first groove face 23 and the second groove face 25. At least part of the outer ring is located in the ring gear 02. A remaining of the outer ring can be formed by the ring gear 02 itself or can likewise be located on the ring gear 02.

The outer ring split in two definitively simplifies both the assembly and disassembly—for repair purposes—of a transmission 01 or a transmission 1000. For assembly, unless the ring gear 02 is itself already provided with the first groove face 23, or—if so—unless two rows of bearings, each formed for instance by V-shaped grooves, are provided (FIG. 14 b), first the ring 22 is located in or on the ring gear 02; this indicates the following: The first groove face 23 of what, viewed from the left, is the first bearing ring can be embodied on the ring gear 02, and the second groove face 25 of the first bearing ring and the first groove face 23 of the second bearing ring can be embodied on a ring 22, and the second groove face 25 of the second bearing ring can be embodied on a ring 24. Because of the first groove face 23, half of the bearing running surfaces toward the ring gear, and thus approximately one-fourth of the total bearing running surfaces for supporting the transmission stages of the transmission 01 or 1000, are located in or on the ring gear 02. Next, the transmission elements forming the transmission stages to be supported or including them or included by them are inserted along the ring gear axis 20. These gear elements are provided with the counterpart running surfaces on the side toward the transmission stages of the one-sided support. As a result, approximately three fourths of the bearing running surfaces are present; however, the one-sided support is still accessible in the direction of the ring gear axis 20. Then, the bearing elements are introduced into the still-open support, three-fourths of which is present, and which is accessible along the ring gear axis 20. Finally, the one-sided support is completed by placing the ring 24, provided with the second groove face 25, along the ring gear axis 20 and securing and/or clamping it against the ring 22.

An additional advantage, worth mentioning, of the V-shaped groove split in two between the groove faces 23, 25 is that as a result, the bearing play of the one-sided support can be established by simple means, because the elements that carry the two groove faces 23, 25 are moved toward or away from one another. This can be done especially simply from outside, for instance by screw connections, which act from the outside on both elements, or the one element can be braced against the other. As a result, bearing elements can still remain in use over a long period of time, which in the prior art already entails a complicated and expensive replacement of the entire support, by simply readjusting the bracing of the two elements carrying the groove faces 23, 25.

FIG. 1, FIG. 2, FIG. 3, FIG. 4, FIG. 5, FIG. 6, FIG. 7 and FIG. 8 show exemplary embodiments of a transmission 01 with a through opening 09 extending through the transmission 01 along the ring gear axis 20.

Furthermore, the transmission 01 shown in FIG. 15, FIG. 16, FIG. 17, FIG. 18, FIG. 19, FIG. 20, and FIG. 21, and the transmission 1000 shown in FIG. 25, FIG. 26, FIG. 27, FIG. 28, FIG. 29, and FIG. 30 have a through opening 09.

The transmissions 01 in FIG. 1, FIG. 2, FIG. 3, FIG. 4, FIG. 5, FIG. 6, FIG. 7 and FIG. 8 are embodied with an output bearing that includes only bearing elements 26, 27 located on one side of the transmission 01.

The transmission 01 has off-center eccentric shafts 03, which are rotatably supported in the rotary body 04 and in flange 07 that is connected to the rotary body 04 and/or included by the rotary body 04.

The off-center eccentric shafts 03 are connected nonrotatably to the planet wheels 08.

The transmission 01 is driven via the sun wheel 84, whose tooth system 85 embodied as an outer tooth system meshes with the tooth systems 81, likewise embodied as outer tooth systems, of the planet wheels 08.

The sun wheel 84 is connected nonrotatably to a wheel that has a tooth system 86 that for example is likewise embodied as an outer tooth system, or the sun wheel includes such a wheel or is included by such a wheel.

A pinion 88 with a tooth system 89 meshes with the tooth system 86. The pinion 88 drives the sun wheel 84.

As shown in FIG. 15 a), a transmission 01 with an additional gear stage can, be embodied with a two-block displacement version. This makes production possible for the wheel provided with the outer tooth system 86, independently of the sun wheel 84. It is provided that a tolerance ring 104 is introduced between a rotary part 84a, provided with the outer tooth system 85 serving as a sun wheel 84, and a rotary part 84b provided with the outer tooth system 86 and slipped, or capable of being slipped, onto the rotary part 84a. The tolerance ring 104 clamps the two rotary parts 84a and 84b nonrotatably relative to one another. As long as the tolerance ring 104 is not introduced between the two rotary parts 84a and 84b, those parts are advantageously freely displaceable and rotatable relative to one another. This two-block displacement version still further simplifies the assembly of the transmission 01 with an additional gear stage.

FIG. 7 shows details of an alternative embodiment of such 01 with a through opening 09; roller elements 45b and 46b, which can be supported in cages 44b and 47b, are used on the off-center eccentric shafts 03.

The off-center eccentric shafts 03 are accordingly supported in integrated rolling contact bearings. The bearing tracks for the roller elements 45b and 46b of the rolling contact bearings are thus formed directly on the off-center eccentric shafts 03 as well as on the rotary body 04 and on the flange 07.

FIG. 8 shows details of an alternative embodiment of a transmission 01 with a through opening 09; rolling contact bearings 45c and 46c are located as a unit for shaft support, as are the roller elements 34, 36 for supporting the cycloidal disks 05, 06 on the eccentric portions 31, 32 of the off-center eccentric shafts 03.

FIG. 9, FIG. 10, FIG. 11, FIG. 12, and FIG. 13 show a transmission 01 with an output bearing that includes bearing elements 26, 27 located, for instance as shown in FIG. 1, on only one side of the transmission 01.

The off-center eccentric shafts 03 of the transmission 01 shown in FIG. 9, FIG. 10, FIG. 11, FIG. 12 and FIG. 13 are located rotatably supported in the rotary body 04 and in the flange 07.

The drive of the transmission 01 is effected via the planet wheels 08 connected nonrotatably to the off-center eccentric shafts 03. The planet wheels 08 are driven via a pinion 88b located for it as a sun wheel coaxially to the ring gear axis 20. For this purpose, the pinion 88b serving as a drive wheel has a tooth system 89b, which is embodied as an outer tooth system and meshes with the tooth systems 81 of the planet wheels 08, which are likewise formed as outer tooth systems.

FIG. 14 shows various embodiments and construction arrangements of the output bearing that includes or is formed by bearing elements 27 located on only one side of the ring gear 02. The output bearing is located on only one side, preferably on the output side of the transmission 01. The choice of the concrete embodiment of the output bearing is dependent on the properties desired, specifications such as construction specifications relating for instance to the structural space, load and/or stress, and combinations of these—without making any claim to completeness.

FIG. 15, FIG. 16, FIG. 17, FIG. 18, FIG. 19, FIG. 20, FIG. 21, FIG. 22, FIG. 23, FIG. 24, FIG. 25 and FIG. 26 show exemplary embodiments of a transmission 01 having output bearings formed by bearing elements 26, 27 located on only one side of the ring gear 02 and with a through opening 09 extending along the ring gear axis 20 through the transmission 01.

Extensions 43 are provided on the rotary body 04. The extensions 43 can for example be formed by pins 43a (FIG. 25) inserted into the rotary body 04.

The off-center eccentric shafts 03, provided with eccentric portions 31, 32, are rotatably supported by means of rolling contact bearings on the extensions 43.

The extensions 43 additionally convert the movements of the one or more cycloidal disks 05, 06, as they roll in the ring gear 02, into a rotary motion of the rotary body 04 as well as a flange 07 that may be connected to it.

Planet wheels 08 are connected nonrotatably to the off-center eccentric shafts 03.

The transmission is driven via the planet wheels 08. For that purpose, the planet wheels 08, with their tooth systems 81 embodied as outer tooth systems, mesh with a tooth system 85 of a sun wheel 84, which tooth system is likewise embodied as an outer tooth system.

The sun wheel 84 is connected nonrotatably to a further wheel with a tooth system 86, which as an example is in one piece (FIG. 15, FIG. 22, FIG. 25, and FIG. 26).

A pinion 88 acting as a drive wheel is provided with a tooth system 89, which meshes with the tooth system 86.

In the transmission 01 shown in FIG. 25, pins 43a are used as extensions 43 in the rotary bodies 04, which are machined as protrusions that for instance have bearing paths or include roller body running faces.

In the transmission 01 shown in FIG. 26, for supporting the off-center eccentric shafts 03, cylindrical rolling contact bearings 45a and 46a are used, instead of the conical rolling contact bearings 45 and 46 in the transmission 01 shown in FIG. 15.

These cylindrical rolling contact bearings 45a and 46a can also be embodied such that cylindrical rollers, for instance located in cages, can be used between the integrated bearing faces, which are formed (not shown) on the extensions 43 machined as protrusions and on the off-center eccentric shafts 03.

FIG. 27 and FIG. 28 show an exemplary embodiment of a transmission 1000 having output bearings formed by bearing elements 26, 27 located on only one side of the ring gear 02.

The transmission 1000 can be equipped with extensions 43 on the rotary body 04, which are embodied as protrusions with running faces for bearing elements 45, 46. The off-center eccentric shafts 03, provided with eccentric portions 31, 32, are rotatably supported by means of rolling contact bearings on the running faces.

The extensions 43 having the off-center eccentric shafts 03 located rotatably upon or at them additionally convert the movements of the one or more cycloidal disks 05, 06, as they roll in the ring gear 02, into a rotary motion of both the rotary body 04 and a flange 07 optionally connected to it.

The transmission 1000 has a central eccentric shaft 300 extending along an axis 003 that coincides with the ring gear axis 20. This eccentric shaft can be provided as a drive shaft. It has a number of eccentric portions 301, 302 equivalent to the number of cycloidal disks 05, 06. The cycloidal disks 05, 06 are located, rotatably supported with a central opening, on the eccentric portions 301, 302.

In the transmission 1000 shown in part in FIG. 29, a wheel 08*a* by which the transmission is then driven is furthermore secured to the central eccentric shaft 300.

A transmission 1000 shown in part in FIG. 30, with output bearings formed by bearing elements 26, 27 located on only one side of the ring gear 02, has only a single cycloidal disk 06. Moreover in this transmission 1000, roller-type rolling contact bearings 45*d* are used. Extensions 43 are located on the rotary body 04 of the transmission 1000, and on each of these extensions an off-center eccentric shaft 03*a* that has an eccentric portion 31 is supported rotatably by means of roller-type rolling contact bearings 45*d*.

A transmission 10 shown in FIG. 31 has bearing elements 201, 202 located on both sides of the ring gear 02.

The transmission 10 has two cycloidal disks 05, 06, rolling in the ring gear 02, and one through opening 09, extending along the ring gear axis 20 through the transmission 10.

Extensions 43 are located on the rotary body 04 of the transmission 10, and on each of these extensions an off-center eccentric shaft 03*a* that has an eccentric portion 31 is supported rotatably by means of bearing elements 45, 46.

It is important to emphasize that the transmission 01 and the transmission 1000 are equipped with an output bearing on one side of the transmission, which output bearing is formed by bearing elements 26, 27 located on only one side of the ring gear 02 or including bearing elements 26, 27 located on only one side of the ring gear 02.

An output bearing with cross rollers 27 and 26 is integrated between the support body 02, ring 22 and 24, and outlet flange 04.

FIGS. 14 *a*) through 14 *i*) also show further embodiments and construction arrangements of the output bearing that is located only on the outlet side of the transmission 01.

The face 23 is located on the ring 22, and the face 25 is located on the ring 24; these faces form the outer grooves V of the output bearing with bearing elements 27 that for example include cross rollers.

The inner grooves V of the output bearing with cross rollers is formed by the faces 41 in the rotary body 04 of the transmission 01, 1000.

The sealing of the outlet side of the transmission 01, 1000 ensures that, between the ring gear 02, for instance acting as a support body or including such a support body, and the ring 24, a seal 91 is provided. This seal 91 can be embodied either as an O-ring as a sealing compound, to name only some conceivable embodiments.

An outlet seal can be located between the ring 24 and the rotary body 04.

Advantages Over the Prior Art are, Among Others, as Follows:

The ring gear 02, embodied for instance as a support body, can be made from a more-economical material. Alternatively, a material having specific properties can be employed. Furthermore, the ring gear 02 can be produced using more-economical technology, such as casting or injection molding, thanks to the construction with the rings 22 and 24. Thus it is not necessary for the ring gear 02 to be made from a costly bearing material, and no technology processes for processing the bearing material, such as hardening, are necessary.

High Bearing Parameters—Radial and Axial Rigidity and Roll Stability:

High and uniform stability of this bearing over the entire circumference of the rotary body 04, in contrast to the prior art, in which the roll stability varies because the stability and/or form of the coupled components of the flange 07 and rotary body 04, which transmit the roll stability of the output bearing, is variable.

Simpler embodiment of the transmission, because the output bearing is only on the outlet side and the play of the output bearing is compensated only in the immediate vicinity of the cross rollers. In the prior art, the play compensation is in the pair of the output bearings via the entire chain consisting of the ring gear 02, bearing pair, and connection of the flange 07 to the rotary body 04 by means of screws 98 and pins 98*b*.

Better access to the lubricating medium, better heat dissipation, and better assembly conditions are ensured, in contrast to the prior art, because the transmission 01, 1000 is practically open from the input side.

In the transmission 01, 10, 1000, the ring gear 02 can be provided with an inner tooth system, which meshes with the cycloidal disks 05, 06 that have an outer tooth system. The inner tooth system can have either an even or an odd number of teeth.

The inner tooth system on the ring gear 02 can be formed by semicircular grooves 21, in which roller elements 94 are located. It is also possible for only some teeth of the inner tooth system in the ring gear 02 to be embodied by grooves 21 in which roller elements 94 are located. The reason for this is that in a cycloidal gear, not all of the structurally provided teeth must be present in order that the cycloidal gear will function properly. It is entirely possible for instance for every other tooth of the inner tooth system of the ring gear 02 to be missing, without restricting the function of the cycloidal gear or cycloidal gear stage.

In the transmission 01, 10, 1000, the rotary body 04 can be connected to the flange 07, or the rotary body 04 and the flange 07 can be connected to one another, for instance by connection elements, such as pins 98*b* and screws 98, to form a unit.

The transmission 01, 10, 1000 has at least one cycloidal disk 05, 06, with tooth system 51, 61 embodied as an outer tooth system. The cycloidal disks 05, 06, with the tooth system 51, 61, mesh with the inner tooth system on the ring gear 02, which inner tooth system is formed by roller elements 94 in the grooves 21 of the inner tooth system in the ring gear 02.

The transmissions 01, 10, 1000 have at least two off-center eccentric shafts 03, which each have at least one eccentric portion 31, 32.

The drawings, with the exception of FIG. 30, show two eccentric faces 31 and 32, which are rotated reciprocally by approximately 180 degrees and at the same time are offset relative to the central shaft axis 30 of the off-center eccentric shaft 03 by the eccentricity "e"; located on these eccentric faces are roller elements 34 and 36 that can be confined in cages 35 and 37, for instance as shown in FIG. 1, or rolling contact bearings 38 and 39, as shown in FIG. 8.

On these eccentric bearings embodied in this way, the cycloidal disks 05 and 06 are rotatably supported via the off-center openings 52 (FIG. 24).

The off-center eccentric shafts 03 are supported both via two central bearings 45 and 46 in the rotary body 04 and also in the flange 07, connected to the rotary body 04 by pins 98b and screws 98 that form connection elements.

For the support of the off-center eccentric shafts 03 in the flange 07 and the rotary body 04, a pair of conical rolling contact bearings can be used, as shown in FIG. 1.

Roller elements 45b, 46b, which can be confined in cages 44b and 47b, can roll on running faces machined directly onto the off-center eccentric shafts 03, as shown in FIG. 7.

Alternatively, the off-center eccentric shafts 03 can be located, rotatably supported, in the rotary body 04 and in the flange 07 by means of bearings 45c and 46c, as shown in FIG. 8.

FIG. 14 shows a plurality of embodiments and construction arrangements of the output bearing, which includes bearing elements 26, 27 located only on one side of the ring gear 02. The one side on which the bearing elements 26, 27 are provided is preferably the outlet side of the transmission.

FIG. 14 a): Exemplary embodiment of the transmission having an output bearing with a one-piece ring gear 02, into which an outer groove V of the bearing is directly integrated with cross rollers 27.

FIG. 14 b): Exemplary embodiment of the transmission having an output bearing with two rows of cross rollers 27 and/or with more than one row of roller elements for increasing the load capacity of the output bearing of the transmission.

FIG. 14 c): Exemplary embodiment of the transmission in which the outer ring of the output bearing consists of a ring gear 02 and a ring 24, between which a groove V of the bearing with cross rollers 27 is formed.

FIG. 14 d): Exemplary embodiment of the transmission in which the outer ring of the output bearing consists of rings 22 and 24, which are secured to the ring gear 02. The inner ring of the output bearing consists of the rings 04a and 04b, which are secured to the rotary body 04 with screws 99. In practical terms this has to do with securing the output bearing by means of connection elements—openings in the rings 22, 24, 04a, 04b—to the transmission.

FIG. 14 e): Exemplary embodiment of the transmission in which an output bearing 100 is secured to the transmission without connection openings. This requires using a ring 22 and 24 and an additional flange 04c, which is screwed onto the outlet flange of the transmission via screws 101. The connection is sealed off with the seal 102 and 103.

FIG. 14 f): Exemplary embodiment of the transmission with an output bearing in which the roller elements are cross conical rollers 27a.

FIG. 14 g): Exemplary embodiment of the transmission with an output bearing with spherical roller elements 27b. This is suitable for applications in which a slight friction in the output bearing is necessary.

FIG. 14 h): Exemplary embodiment of the transmission with an output bearing in which the roller elements 27c are embodied in alternation as radial and axial cylindrical rollers separated from one another by separators, and the roller elements 26c are embodied as axial cylindrical rollers located separately by means of axial separators.

FIG. 14 i): Exemplary embodiment of the transmission with an output bearing in which the roller elements 26d are embodied as two rows of cylindrical rollers located separately by means of axial separators, and the roller elements 27d form a radial cylindrical rolling contact bearing.

In the transmissions 01 shown in FIG. 15 through FIG. 24, at least two extensions 43 are provided on the rotary body 04. For example, the extensions 43 can have cylindrical faces on which, by means of inner rings, a pair of conical rolling contact bearings 45 and 46 are inserted.

The play compensation in the conical rolling contact bearings 45 and 46, which are inserted into the extensions 43 of the rotary body 04, is limited by the securing nut 48. That in turn is secured by securing shims 47.

Preferably, rolling contact bearings which are formed of roller elements 36 and 37 that can be accommodated in cages 34 and 36 are located on the eccentric portions 31, 32. On the eccentric portions 31, 32 embodied in this way, the cycloidal disks 05 and 06 are supported with their off-center through openings 52 provided for the purpose.

In the transmission 01 with a through opening 09, shown in FIG. 15, FIG. 16, FIG. 17, FIG. 18, FIG. 19, FIG. 20, FIG. 21, FIG. 22, FIG. 23, and FIG. 24, the planet wheels 08 with the tooth system 81 mesh with the tooth system 85 of the sun wheel 84. The latter is connected nonrotatably to a wheel that has a tooth system 86. The tooth system 89 of a pinion 88b, serving as a drive wheel, meshes with the tooth system 86 of the wheel connected rotatably to the sun wheel 84.

In an embodiment of the transmission 01 shown in FIG. 9, FIG. 10, FIG. 11, FIG. 12, and FIG. 13, the planet wheels 08, with their tooth systems 81, mesh directly with the tooth system 89b of the pinion 88b which is located in the form of a sun wheel.

On the rotary body 04, it is furthermore possible for one or more, for instance three, elements 42 to be embodied and/or located.

The flange 07 can be connected to the rotary body 04 via the elements 42. For example, the flange 07 can be inserted into the elements 42.

The flange 07 can be secured to and/or connected to the rotary body 04 via the elements 42 and the extensions 43.

For instance, the flange can be secured by means of screws 98 to the elements 42 and/or the extensions 43 and thus connected to the rotary body 04.

The elements 42 serve primarily to reinforce the securing of the flange 07 to the rotary body 04 and to increase the stiffness of this connection.

In the transmission 01 shown in FIG. 26, instead of the conical rolling contact bearings 45 and 46 of FIG. 15 for supporting the off-center eccentric shafts 03, cylindrical rolling contact bearings 45a and 46a are provided. These cylindrical rolling contact bearings 45a and 46a can also be embodied such that between the integrated bearing faces, which are formed on the extensions 43 and the off-center eccentric shafts 03, cylinders enclosed in cages are used (not shown).

The transmission 1000 shown in FIG. 27 and FIG. 28 is driven via a central eccentric shaft 300.

The central eccentric shaft 300 is centrally located in a rolling contact bearing. FIG. 27 and FIG. 28 show a bearing which is formed by roller elements 307, which are confined in a cage 308 and can roll on a running face embodied on the flange 07. In FIG. 27, a bearing is also shown which is formed by roller elements 309.

The central eccentric shaft 300 has at least one eccentric portion 301, 302. FIG. 27 shows a central eccentric shaft 300 with two eccentric portions 301, 302, which are rotated reciprocally by approximately 180 degrees and at the same time are offset relative to the ring gear axis 20 of the ring gear 02 or relative to axis 03 of the shaft by the eccentricity "e".

One cycloidal disk 05, 06 is supported per eccentric portion 301, 302 in cages 304 and 306 via a face 501 and 601 on one of the eccentric portions 301 and 302 of the central eccentric shaft 300 via eccentric bearings or roller elements 303 and 305.

In contrast to the transmission 01 shown in FIG. 15 through FIG. 24, the transmission 1000 does not have any planet wheels 08.

In the transmission 1000 shown in FIG. 29, a drive wheel 08a with a tooth system 81a is secured to the central eccentric shaft 300, and the transmission 1000 can be driven by way of this drive wheel.

The transmission 1000 shown in FIG. 29 is equipped with only one cycloidal disk 06, which is driven via a central eccentric shaft 300.

The central eccentric shaft 300 has an eccentric portion 301, which relative to the central axis 003 of the central eccentric shaft 300 is offset by an eccentricity "e".

The central eccentric shaft 300 is supported centrally rotatably relative to the flange 07 by means of a bearing or by means of roller elements 307, which can be accommodated in a cage 308. Compared to the rotary body 04, the central eccentric shaft 300 is supported rotatably by means of a bearing or for instance by means of roller elements 309 retained in a cage 310.

The transmission 1000 has at least two off-center eccentric shafts 03a. The off-center eccentric shafts 03a are supported centrally via bearings 45d on at least two extensions 43 of the rotary body 04.

The cycloidal disk 06 is supported rotatably with a face 501, formed by a central through opening, on the eccentric portion 301 of the central eccentric shaft 300.

For the rotatable bearing on the eccentric portion 301 of the central eccentric shaft 300, roller elements 305a are provided, which are supported in a cage 306a.

Each of the at least two off-center eccentric shafts 03a is rotatably supported with its eccentric portion 31a in an off-center opening 52 in the cycloidal disk 06. Roller elements 35, which can be retained in cages 34, can be provided for the rotatable support of the off-center eccentric shafts 03a with their eccentric portions 31a in the off-center openings 52 of the cycloidal disk 06.

The transmission stages of the transmission 10 shown in FIG. 31 are supported on both sides of the ring gear 02.

Here the rotary body 04 is supported on the one side on the ring gear 02 via a bearing 202, and the flange 07 connected to the rotary body 04 is supported on the other side on the ring gear 02 via a bearing 201.

The transmission 10 is equipped with:
at least two extensions 43 on the rotary body 04;
at least two off-center eccentric shafts 03, which have at least one eccentric portion 31; and
at least one cycloidal disk 05, 06.

When there are two or more eccentric portions 31 and 32, they are distributed uniformly over one revolution. For example, two eccentric portions are rotated reciprocally by approximately 180 degrees and are offset relative to the respective central axes 30 of the off-center eccentric shafts 03 by the eccentricity "e".

The off-center eccentric shafts 03 are centrally supported via rolling contact bearings 45 and 46 on the extensions 43 of the rotary body 04.

The number of cycloidal disks 05, 06 is equivalent to the number of eccentric portions of the off-center eccentric shafts 03.

The cycloidal disks 05, 06 are supported rotatably with their off-center openings 52, via roller elements 35 and 37 that are introduced into cages 34 and 36, on the eccentric portions 31 and 32 of the off-center eccentric shafts 03.

In FIG. 27, FIG. 28, FIG. 29, and FIG. 30, the invention furthermore includes transmissions 1000 shown in their entirety or in parts, having a ring gear 02 with a ring gear axis 20, having at least one cycloidal disk 05, 06 rolling in the ring gear with at least one off-center opening, having a rotary body 04 supported rotatably on one side of the ring gear 02 and one or more off-center eccentric shafts 03, located jointly rotatably around the ring gear axis 20 and connected to the rotary body 04 and supported rotatably relative to it, with a number of eccentric portions 31, 32 equivalent to the number of cycloidal disks 05, 06, with which eccentric portions the off-center eccentric shafts 03 are rotatably supported each in one off-center opening of the at least one cycloidal disk 05, 06.

One or more extensions 43 can be located on the rotary body 04. One off-center eccentric shaft 03 can be rotatably supported on each of the extensions.

The extension or extensions 43 can convert rolling motions of the one or more cycloidal disks 05, 06, via the off-center eccentric shafts 03 and their bearings on them into rotary motions of the rotary body 04 and of a flange 07 optionally connected to it.

A flange 07 can be connected to the rotary body 04 via a number of extensions 43, equivalent to the number of off-center eccentric shafts 03, on each of which extensions a respective off-center eccentric shaft 03 is rotatably supported. The extension or extensions 43 are located off-center on the rotary body 04 and on the flange 07. For example, the extensions 43 can be embodied integrally with the rotary body 04 and/or on the flange 07. They can be connected to their counterpart by securing means. Alternatively, they can be inserted into one or both of the two counterparts (duck 04 and flange 07), for instance in the form of the pins 43a described. Alternatively or in addition, they can be secured to the counterparts or to one of both by securing means, such as screws.

To stiffen the connection between the rotary body 04 and flange 07, elements 42 can be provided, which extend through off-center through openings in the cycloidal disks 05, 06. These elements 42 can in principle be provided either alternatively or in addition, for converting rolling motions of the one or more cycloidal disks 05, 06 into rotary motions of the rotary body 04.

Moreover, a multi-speed transmission 10 shown in FIG. 31 is a subject of the invention. It includes a planetary gear stage with a sun wheel 84 and at least one planet wheel 08 as well as a cycloidal gear stage with a ring gear 02 having a ring gear axis 20, at least one cycloidal disk 05, 06 rolling therein it having at least one off-center opening and a number, equivalent to the number of planet wheels 08, of off-center eccentric shafts 03 located rotatably around the ring gear axis 20 and each connected nonrotatably to a respective planet wheel 08, with a number of eccentric portions 31, 32, equivalent to the number of cycloidal disks 05, 06, with which eccentric portions the off-center eccentric shafts 03 are rotatably supported, each in one off-center opening of the at least one cycloidal disk 05, 06.

The transmission 10 furthermore includes a rotary body 04, which is rotatably supported about the ring gear axis 20 on one side of the ring gear 02.

Furthermore, the transmission 10 includes a flange 07, which is connected nonrotatably to the rotary body 04. The sun wheel 84 of the transmission 10 is advantageously rotatably supported on the flange 07.

The flange 07 is on the same side on which the rotary body 04 is supported rotatably on the ring gear 02.

On the rotary body 04 and/or on the flange 07, one or more extensions 43 are located, by way of which the rotary body 04 and flange 07 can be connected to one another. The number of extensions 43 is equivalent to the number of off-center eccentric shafts 03. One off-center eccentric shaft 03 is supported rotatably on each extension 43.

Furthermore, for stabilizing the connection of the flange 07 to the rotary body 04, the transmission 10 can include one or more elements 42, which through off-center openings on the at least one cycloidal disk 05, 06 connect the flange 07 to the rotary body 04. The flange 07 and rotary body 04 here form counterparts, connected nonrotatably to one another via one or more elements 42. The element or elements 42 can be embodied for instance in one piece on one of the counterparts. It is also possible to split the elements 42 in the middle, approximately halfway between the flange 07 and the rotary body 04. In this connection, it has proved advantageous that the faces with which the portions of the elements 42 are secured to one another are to be embodied not in flat form but rather corresponding to one another, for instance in undulating fashion. As a result, self-centering can be attained upon assembly. Fundamentally, this is also possible in a context without a division of the elements 42.

When there is a plurality of elements 42, in particular an even number of them, it is possible for one element to be located in alternation on the rotary body 04 and another on the flange 07, for instance being connected in one piece with the corresponding counterpart. On the remaining counterpart, securing means can be provided, such as screws, for producing a rigid connection. In principle, elements 42 can be secured to both counterparts by means of securing means, such as screws.

By a corresponding embodiment of a contact between the elements 42 and the walls of the off-center through openings in the cycloidal disks 05, 06, through which disks the elements 42 extend, the elements 42 can serve to convert the rolling motions of the cycloidal disks 05, 06 in the ring gear 02 into a rotary motion of the rotary body 04 and of the flange 07 connected to it or can contribute to such a conversion.

Especially advantageously, the flange 07 caps the eccentric shafts 03 and the planet wheels 08 connected to them nonrotatably. In this embodiment, the at least one cycloidal disk 05, 06 and the at least one planet wheel 08 of the transmission 10 is located between the rotary body 04 and the flange 07. The result is an embodiment of the transmission 10 with an especially high load capacity.

It is important to emphasize that such an embodiment can also be chosen for the transmission 01, in order to increase its load capacity.

Advantageously, between the rotary body 04 and the flange 07, viewed in the order from the rotary body 04 outward, cycloidal disks 05, 06 as well as the planet wheels 08 connected nonrotatably with the off-center eccentric shafts 03 are located.

By fully attaining the stated object by essentially simplifying the production and assembly of the transmission 01, 10, 1000, further advantages over the prior art are achieved, in that by the provisions described, compact transmissions 01, 10, 1000 with integrated auxiliary gearboxes are created. In comparison to the prior art, all the transmissions 01, 10, 1000, have improved fastening options for sealing the covers from the input side via the internal assembly in or on the ring gear 02, in order to be able to assemble and install the respective transmission 01, 10, 1000 in a machine, such as an industrial robot.

In the prior art, the load capacity of the embedded one-sided support is less, since a bearing with a smaller cross section and thus lower characteristic values has to be installed in the space available. In contrast, in the transmission 01, 10, 1000 a larger installation space is created, since the bearing here is integrated directly by means of the groove faces 23, 25.

The transmission 01, 10, 1000 can alternatively or in addition have individual features, or a combination of a plurality of features, recited at the outset in connection with the prior art and/or in one or more documents mentioned as prior art, and/or in the foregoing description.

The invention is not limited by the description made in the context of the exemplary embodiments. Instead, the invention includes each new feature as well as each combination of features, which in particular includes any combination of features in the claims, even if this feature or this combination itself is not explicitly mentioned in the claims or exemplary embodiments.

The invention is applicable commercially in particular in the field of manufacturing transmissions, for instance those for actuating drives.

Preferably the additional gear stage includes a pinion meshing with the sun wheel of the planetary gear stage or wheel connected nonrotatably to the sun wheel.

Preferably the sun wheel (84) includes a first rotary part (84a) provided with an outer tooth system (85) and a second rotary part (84b) provided with an outer tooth system (86), which rotary parts are nonrotatably connected to one another by means of a tolerance ring (104) located between them.

Preferably wherein the transmission (01) has a central through opening (09).

Preferably the off-center eccentric shafts (03) are rotatably supported on a rotary body (04) that is rotatably supported on the ring gear (02) around the ring gear axis (20).

The invention has been described with reference to preferred embodiments. However, for one skilled in the art it is conceivable that modifications or changes to the invention can be made without departing from the scope of the claims that follow.

LIST OF REFERENCE NUMERALS

01 Transmission
02 Ring gear
03 Off-center eccentric shaft
03a Off-center eccentric shaft (FIG. 30, FIG. 31)

04 Rotary body
04a Ring of the output bearing (FIG. 14 d))
04b Ring of the output bearing (FIG. 14 d))
04c Supplementary flange for the flange 07 (FIG. 14 e))
05 Cycloid disk
06 Cycloid disk
07 Flange
07a Protrusion
08 Planet wheel
08a Wheel (FIG. 29)
09 Through opening (FIGS. 1 through 8)
20 Ring gear axis
21 Grooving of the ring gear 20
22 Ring
23 Groove face V on the ring 22
24 Ring
25 Groove face V on the ring 24
26 Bearing element (row of cross rollers (FIG. 23))
26c Roller elements 26c located as axial rollers (separated by axial separators, for example)
26d Roller elements 26d located in the form of two rows of axial rollers (separated for example by axial separators) (FIG. 14 i))
27 Bearing element (row of cross rollers (FIG. 23))
27a Cross conical rollers (conical rolling contact bearing) (FIG. 14 f))
27b Bearing with spherical roller elements (FIG. 14 g))
27c Roller elements located as a row of axial rollers (FIG. 14 h))
27d Roller elements located as a row of radial rollers (FIG. 14 i))
28 A row of separators (FIG. 22, FIG. 23)
29 A row of separators (FIG. 22, FIG. 23)
30 Shaft axis of the off-center eccentric shaft 03
31 Eccentric portion of the off-center eccentric shaft 03
32 Eccentric portion of the off-center eccentric shaft 03
31a Eccentric portion of the off-center eccentric shaft 03a (FIG. 30, FIG. 31)
32a Eccentric portion of the off-center eccentric shaft 03a (FIG. 30, FIG. 31)
33 Molding surface on the off-center eccentric shaft 03
34 Roller element
35 Cage for roller element 34
36 Roller element
37 Cage for roller element 36
38 Rolling contact bearing
39 Rolling contact bearing
40 Axis of the rotary body 04
41 V grooves of the bearing with cross rollers in the rotary body 04
42 Element
42a Protrusion
43 Extension
43a Pin (inserted as extension 43 in rotary body 04; FIG. 25)
44 Shim
44b Cage (FIG. 7)
45 Bearing element (conical rolling contact bearing from the outlet side of the transmission)
45a Cylindrical rolling contact bearing (FIG. 26)
45b Roller element (FIG. 7)
45c Rolling contact bearing
45d Rolling contact bearing (FIG. 30)
46 Bearing element (conical rolling contact bearing from the input side of the transmission)
46a Cylindrical rolling contact bearing (FIG. 26)
46b Roller element (FIG. 7)
46c Rolling contact bearing
47 Securing shim (FIG. 15)
47b Cage for roller element 45b (FIG. 7)
48 Securing nut (FIG. 15)
50 Axis of the cycloidal disk 05
51 Tooth system of the cycloidal disk 05
52 Off-center opening (in cycloidal disk for eccentric shaft 03)
53 Off-center opening (form opening in cycloidal disk for element 42)
60 Axis of the cycloidal disk 06
61 Tooth system of the cycloidal disk 06
81 Tooth system of the planet wheel 08
81a Tooth system of the wheel 08a (FIG. 29)
82 Molding surface of the planet wheel 08
83 Bearing for supporting the sun wheel 84 on the flange 07
84 Sun wheel
84a Rotary part
84b Rotary part
85 Tooth system (for meshing with the tooth systems 81 of the planet wheels 08)
86 Tooth system (for meshing with the tooth system 89 of the wheel 88)
87 Bearing of the sun wheel 84
88 Pinion
88b Pinion (FIG. 9)
89 Tooth system of the wheel 88
89b Tooth system (for meshing with tooth systems 81 of the planet wheels 08; FIG. 9)
91 Seal (O-ring between ring gear 02 and ring 24)
92 Screw (securing ring gear 02-ring 24 or ring 22, 24 (FIG. 14 d))
93 Outlet seal
94 Roller element (in grooves 21 of the ring gear 02)
95 Shim
96 Securing ring
97 Screw (securing wheel 08a-flange 07; FIG. 29)
98 Screw (connection rotary body 04-flange 07)
98b Pin (conical; in connection with rotary body 04 and flange 07)
99 Screw (securing ring 04a, 04b on the flange 07; FIG. 14 d))
100 Output bearing (as a unit; FIG. 14 e))
101 Screw (securing additional flange 04c to rotary body 04; FIG. 14 e))
102 Seal (O-ring/sealing compound additional flange 04c-rotary body 04; FIG. 14 e))
103 Seal (O-ring/sealing compound additional flange 04c-rotary body 04; FIG. 14 e))
104 Tolerance ring
201 Bearing element (FIG. 31)
202 Bearing element (FIG. 31)
300 Central eccentric shaft (FIG. 27)
003 Axis of the central eccentric shaft (FIG. 27)
301 Eccentric portion of the central eccentric shaft 300
302 Eccentric portion of the central eccentric shaft 300
303 Roller element on eccentric portion 301 of the central eccentric shaft 300
304 Cage for roller elements 303
305 Roller element on eccentric portion 302 of the central eccentric shaft 300
305a Roller element on the eccentric portion 301 (FIG. 30)
306 Cage for roller elements 305
306a Cage for roller elements 305a (FIG. 30)
307 Roller element
308 Cage for roller elements 307
309 Roller element
310 Cage for roller elements 309

311 Seal
501 Central opening of the cycloidal disk 05 for eccentric portion 302 of the central eccentric shaft 300
502 Central opening of the cycloidal disk 06 for eccentric portion 302 of the central eccentric shaft 300

We claim:

1. A transmission, having a planetary gear stage with a sun wheel and at least one planet wheel and having a cycloidal gear stage with a ring gear with a ring gear axis, at least one cycloidal disk rolling therein with at least one off-center opening and a number, equivalent to the number of planet wheels, of off-center eccentric shafts located jointly rotatably around the ring gear axis and each connected nonrotatably to one planet wheel, with a number of eccentric portions equivalent to the number of cycloidal disks, which eccentric portions are each supported in a respective off-center opening in the at least one cycloidal disk, and having a support of its gear stages relative to the ring gear on one side of the ring gear, characterized in that
   first surfaces are embodied on the eccentric shafts and second surfaces are embodied on the planet wheels, with which surfaces the planet wheels mesh with the first surfaces on the eccentric shafts,
   the transmission including a groove, the groove including a first groove face and a second groove face and the groove being split in two between the first groove face and the second groove face, which groove faces form bearing running faces on the ring gear side for bearing elements of a one-sided bearing supporting the gear stages relative to the ring gear on one side of the ring gear, and
   the transmission including an outer ring, split in two, with the first groove face and with the second groove face, which together form the groove, and wherein the splitting into two of the outer ring extends between the first groove face and the second groove face.

2. The transmission of claim 1, wherein the transmission includes roller elements located in the ring gear, with which elements the cycloidal disk rolling in engagement on its outer circumference; and
   wherein the roller elements are secured in the direction parallel to the ring gear axis by at least one ring.

3. The transmission of claim 1, wherein the transmission has a central eccentric shaft with a number of eccentric portions equivalent to the number of cycloidal disks, on each of which eccentric portions a cycloidal disk is rotatably located.

4. The transmission of claim 3, wherein a wheel is connected nonrotatably to the central eccentric shaft.

5. The transmission of claim 1, wherein the off-center eccentric shafts reach through off-center openings of the at least one cycloidal disk, the off-center eccentric shafts converting the motions of the at least one cycloidal disk, as the at least one cycloidal disk rolls in the ring gear, into a rotary motion.

6. The transmission of claim 1, including a bearing supporting the gear stages relative to the ring gear on one side of the ring gear, wherein the bearing is located on the side of the ring gear facing away from the planetary gear stage.

7. The transmission of claim 1, wherein the transmission includes an additional gear stage.

8. A transmission (1000) having a ring gear with a ring gear axis, at least one cycloidal disk, rolling in the ring gear and having at least one off-center opening, a rotary body rotatably supported on one side of the ring gear and one or more off-center eccentric shafts, jointly located rotatably around the ring gear and supported rotatably relative to the rotary body, with a number of eccentric portions equivalent to the number of cycloidal disks, with which eccentric portions the off-center eccentric shafts are rotatably supported each in one off-center opening in the at least one cycloidal disk, characterized in that
   wherein the transmission includes a groove, the groove including a first groove face and a second groove face and being split in two between the first groove face and the second groove face, which groove faces form bearing running faces on the ring gear side for bearing elements of a one-sided bearing supporting the gear stages relative to the ring gear on one side of the ring gear; and wherein
   extensions extending parallel to the ring gear axis are located on the rotary body, about which extensions the off-center eccentric shafts are located rotatably with their eccentric portions.

9. The transmission of claim 8, wherein the transmission includes an outer ring, split in two, with the first groove face and with the second groove face, which together form the groove, and wherein the splitting into two of the outer ring extends between the first groove face and the second groove face.

10. The transmission of claim 8, wherein the transmission has a central eccentric shaft with a number of eccentric portions equivalent to the number of cycloidal disks, on each of which eccentric portions a cycloidal disk is rotatably located.

11. The transmission of claim 10, wherein the transmission is driven via the central eccentric shaft.

12. The transmission of claim 8, wherein the transmission includes a flange connected nonrotatably to the rotary body.

13. A transmission, which includes a planetary gear stage with a sun wheel and at least one planet wheel as well as having a cycloidal gear stage with a ring gear with a ring gear axis, at least one cycloidal disk rolling therein with at least one off-center opening and a number, equivalent to the number of planet wheels, of off-center eccentric shafts located jointly rotatably around the ring gear axis and each connected nonrotatably to one planet wheel, with a number of eccentric portions equivalent to the number of cycloidal disks, with which eccentric portions the off-center eccentric shafts are each rotatably supported in a respective off-center opening of the at least one cycloidal disk, wherein the transmission furthermore includes a rotary body, which is rotatably supported on one side of the ring gear about the ring gear axis, and also has a flange, which is connected nonrotatably to the rotary body and is rotatably supported on the opposite side on the ring gear, and wherein one or more extensions are located on the rotary body and/or on the flange, and the number of extensions is equivalent to the number of off-center eccentric shafts, and one off-center eccentric shaft is rotatably supported on each extension; and wherein
   protrusions are embodied on the flange and protrusions corresponding to the protrusions are embodied on the rotary body, which protrusions mesh with one another upon being put together.

14. The transmission of claim 13, wherein the extensions are formed by pins inserted into the rotary body.

15. The transmission of claim 13, wherein the flange caps the eccentric shafts and the planet wheels connected to them nonrotatably, so that the at least one cycloidal disk and the at least one planet wheel are located between the rotary body and the flange.

16. The transmission of claim 13, wherein integrated bearing faces for bearing elements are embodied on the extensions and on the off-center eccentric shafts.

17. A transmission, having a planetary gear stage with a sun wheel and at least one planet wheel and having a cycloidal gear stage with a ring gear with a ring gear axis, at least one cycloidal disk rolling therein with at least one off-center opening and a number, equivalent to the number of planet wheels, of off-center eccentric shafts located jointly rotatably around the ring gear axis and each connected nonrotatably to one planet wheel, with a number of eccentric portions equivalent to the number of cycloidal disks, which eccentric portions are each supported in a respective off-center opening in the at least one cycloidal disk, and having a support of its gear stages relative to the ring gear on one side of the ring gear, characterized in that
- first surfaces are embodied on the eccentric shafts and second surfaces are embodied on the planet wheels, with which surfaces the planet wheels (08) mesh with the first surfaces on the eccentric shafts, and
- the transmission having a central eccentric shaft with a number of eccentric portions equivalent to the number of cycloidal disks, on each of which eccentric portions a cycloidal disk is rotatably located.

18. The transmission of claim 17, wherein the transmission includes a groove, the groove including a first groove face and a second groove face and the groove being split in two between the first groove face and the second groove face, which groove faces form bearing running faces on the ring gear side for bearing elements of a one-sided bearing supporting the gear stages relative to the ring gear on one side of the ring gear.

19. The transmission of claim 17, wherein the transmission includes an outer ring, split in two, with the first groove face and with the second groove face, which together form the groove, and wherein the splitting into two of the outer ring extends between the first groove face and the second groove face.

20. The transmission of claim 17, wherein the transmission has a central eccentric shaft with a number of eccentric portions equivalent to the number of cycloidal disks, on each of which eccentric portions a cycloidal disk is rotatably located.

21. The transmission of claim 17, wherein a wheel is connected nonrotatably to the central eccentric shaft.

22. The transmission of claim 17, wherein the off-center eccentric shafts reach through off-center openings of the at least one cycloidal disk, the off-center eccentric shafts converting the motions of the at least one cycloidal disk, as the at least one cycloidal disk rolls in the ring gear, into a rotary motion.

23. The transmission of claim 17, including a bearing supporting the gear stages relative to the ring gear on one side of the ring gear, wherein the bearing is located on the side of the ring gear facing away from the planetary gear stage.

24. The transmission of claim 17, wherein the transmission includes an additional gear stage.

25. The transmission of claim 17, wherein the transmission includes roller elements located in the ring gear, with which elements the cycloidal disk rolling in engagement on its outer circumference; and
- wherein the roller elements are secured in the direction parallel to the ring gear axis by at least one ring.

* * * * *